(12) United States Patent
Matsuzawa

(10) Patent No.: US 6,490,292 B1
(45) Date of Patent: Dec. 3, 2002

(54) ROUTER APPARATUS AND FRAME TRANSFER METHOD

(75) Inventor: Shigeo Matsuzawa, Tokyo (JP)

(73) Assignee: Kabushiki Kaisha Toshiba, Kawaski (JP)

( * ) Notice: Subject to any disclaimer, the term of this patent is extended or adjusted under 35 U.S.C. 154(b) by 0 days.

(21) Appl. No.: 09/267,769

(22) Filed: Mar. 15, 1999

(30) Foreign Application Priority Data

Mar. 13, 1998 (JP) .......................................... 10-062890

(51) Int. Cl.[7] .............................................. H04L 12/56
(52) U.S. Cl. ..................................... 370/401; 370/395.1
(58) Field of Search ................................ 370/464, 465, 370/466, 467, 468, 474, 389, 399, 229, 231, 232, 233, 401, 402, 403, 351, 352, 470, 471, 475, 477, 396, 397, 395.31, 395.52, 395.53, 395.1

(56) References Cited

U.S. PATENT DOCUMENTS 5,835,710 A * 11/1998 Nagami et al. ............. 370/351
5,930,259 A * 7/1999 Katsube et al. ............. 370/392
6,188,689 B1 * 2/2001 Katsube et al. ............. 370/252

* cited by examiner

*Primary Examiner*—Dang Ton
(74) *Attorney, Agent, or Firm*—Foley & Lardner

(57) ABSTRACT

A router has a function of providing a label used for transferring a datalink frame by a cut-through operation (i.e., datalink-layer switching). Whether the cut-through operation is to be performed or not is indicated by a cut-through declarator described in a prescribed portion (e.g., OUI field) within an upper-layer-protocol identifying information region (e.g., SNAP field) of a received frame or signaling message. The information described in the remaining portion (e.g., PID field) within the upper-layer-protocol identifying information region and the information described in the destination or source datalink-layer address region of the received frame or signaling message are used as the label for identifying in the datalink layer a packet flow to which a received frame belongs.

21 Claims, 13 Drawing Sheets

| 701 | 702 | 703 | 704 |
|---|---|---|---|
| CUT-THROUGH LABEL IDENTIFIER | OUTPUT INTERFACE | NEXT-HOP MAC ADDRESS | DOWNSTREAM CUT-THROUGH LABEL IDENTIFIER |
| --- | --- | --- | --- |

FIG.7

| 801 | 802 | 803 |
|---|---|---|
| DATAGRAM FLOW | OUTPUT-SIDE CUT-THROUGH LABEL IDENTIFIER | INPUT-SIDE CUT-THROUGH LABEL IDENTIFIER |
| --- | --- | --- |

FIG.8

| 1601 | 1602 | 1603 |
|---|---|---|
| VPI/VCI | OUTPUT VPI/VCI | OUTPUT INTERFACE |
| ⋮ | ⋮ | ⋮ |
| | | |

FIG. 16

| 1701 | 1702 | 1703 | 1704 |
|---|---|---|---|
| CUT-THROUGH DECLARATOR | FLOW IDENTIFIER | ADDRESS TYPE | LINK ADDRESS |

FIG. 17

ROUTER APPARATUS AND FRAME TRANSFER METHOD

BACKGROUND OF THE INVENTION

1. Field of the Invention

The present invention relates to a router that connects communication networks and to transfer frames, and also to a frame transfer method used in the router.

2. Description of the Related Art

Routers, which are used for connecting different local area networks (LANs), transfer datagrams from one LAN to another LAN. A datagram includes not only communication information to be transferred, but also communication network addresses (which are the Internet Protocol (IP) addresses if communications are made by the IP), such as a source address and a final destination address. By using the address information, the router determines its network interface through which the datagram is to be output and a next-hop nodes (a router or a host) to which the datagram is to be transferred.

In a typical conventional router, upon receiving from a LAN a datalink layer frame (for example, a Media Access Control (MAC) frame or an Asynchronous Transfer Mode (ATM) cell) defined by a datalink layer (for example, the MAC layer or the ATM layer), datalink layer processing is performed on the received frame, and then, the frame is converted into a packet (datagram) that can be handled in the network layer. Subsequently, the router determines, based on the network layer address of the final destination described in the datagram, the output interface of the router through which the datagram is to be output and the network layer address of the next-hop node to which the output datagram is to be transferred. The router then delivers the datagram to the determined output interface. The output interface determines the datalink layer address from the network layer address of the next-hop node, and constructs a datalink layer frame and outputs it to a LAN.

The conventional router transfers communication information according to the above-described procedure. In other words, after converting the received datalink layer frame into network layer packet, the router refers to the content of the packet, such as the final destination address and the source address, and then determines, based on the network layer routing table stored in the router, the output interface and the next-hop node to which the packet is to be transferred. Afterwards, the router re-converts the network layer packet into a datalink layer frame and then outputs it toward the next-hop node.

During the above transfer operation, a heavy load of processing is imposed on the router, such as conversion from the received datalink layer frame into a network layer packet, search through the network layer routing table, and re-conversion from the packet into a datalink frame, thereby increasing the processing time required for transferring the received datalink layer frame land the processing load within the router.

In order to reduce the processing load in the router, the following method has been proposed in which the next-hop node is determined in the datalink layer without referring to network layer information described In the packet. This transfer method is sometimes referred to as the "cut-through transfer", "label switching", or "datalink-layer switching".

In a shared-media network, such as the Ethernet, there are two types of methods for implementing the "cut-through transfer" function.

In one method, a specific field having a few bytes is installed between the datalink header of the MAC frame and network protocol data such as the IP data (See Y. Rekhter et al., "Tag Switching Architecture—Overview", IETF Internet Draft draft-rekhter-tagswitch-arch-00.txt, January 1997). Then, a virtual identifier (corresponding to a "label", which will be described later) assigned in correspondence with a network layer packet flow (defined by, for example, the final destination information, or a combination of the destination information and the source information) is filled in the specific field, thereby determining the next-hop node based on the datalink layer frame itself (i.e., switching the frame in the datalink layer). According to this method, since a specific field is installed in a payload of the MAC frame, the length of the network protocol data in the frame which is to be transferred by using this "cut-through" function is shorter than that in a typical frame whose next-hop node is to be determined in the network layer. It is thus necessary to re-adjust and modify the length of the datagram in the network layer in order to implement the aforementioned cut-through transfer function.

In the other method, the above-described virtual identifier is written into the MAC address (See U.S. patent application Ser. No. 08/941,735 now U.S. Pat. No. 6,188,689). In this method, it is necessary to newly learn the MAC address which is actually the virtual identifier in the router or the host. This learning may also be necessary in a bridge device, an Ethernet switch, etc. in the shared-media network.

To implement the cut-through function in a virtual-connection network, such as an ATM network, a virtual connection within a LAN, which is supposed to transfer frames by the cut-through method, is uniquely identified by the nodes located at both ends of the virtual connection. After this identification of the virtual connection is completed in the both nodes, frames are transmitted and transferred by using the virtual connection corresponding to the network layer packet flow to which the frames belong. If an ATM switch is provided within the LAN (i.e., between an upstream node and a downstream node of one virtual connection), the ATM switch converts the Virtual Path Identifier/Virtual Connection Identifier (VPI/VCI) used in the ATM and, as a result, the upstream node and the downstream node cannot identify the virtual connection as the common value. To identify the virtual connection uniquely even in this kind of situation, there may be two methods available for sharing the virtual connection identifier by the two neighboring nodes.

In one method, an identifier that can be shared by the two neighboring nodes is sent through the virtual connection itself (i.e. the common identifier is sent by an inband message) (See K. Nagami et al., "Flow Attribute Notification Protocol (FANP) Specification", IETF Internet Draft draft-rfced-info-nagami-00.txt, February 1997). In this method, since a message including the identifier of the connection is sent onto the connection itself, the following problem is encountered, for example, when a point-multipoint connection is used in a switching function of the router. In this case, when a new leaf is added to an existing cut-through connection, the cut-through transfer operation is required to be temporarily halted in order to send a message including the common identifier onto the cut-through connection.

In the other method, a formal common identifier of a target virtual connection can be finally shared by the two neighboring nodes according to the following two steps of operation (See U.S. patent application Ser. No. 09/038,159). A provisional common identifier whose size is shorter than that of the formal common identifier is initially shared by the two neighboring nodes, by writing the provisional common identifier into a field, which can be freely used by an user, in a signaling message for setting the target virtual connection. Then, a message for correlating the provisional identifier and the formal identifier of a sufficient length is sent onto a connection other than the target virtual (i.e., by an out-band message). This method is free from the problem encountered by the in-band message method. However, when the point-multipoint connection is used in a switching function of the router, the provisional identifier may need to be locked for a new leaf, which may be added to the existing connection later. In this case, there may become no more provisional identifier available for a new connection to be set.

SUMMARY OF THE INVENTION

It is therefore an object of the present invention to provide a mechanism for enabling a router that connects shared-media networks, such as the Ethernet, to do the datalink-layer switching for high-speed, low-latency packet transfer, without needing to readjust or modify the packet length or to learn additional MAC addresses.

Another object of the present invention is to provide a mechanism for enabling a router that connects virtual-connection networks, such as ATM networks or frame relays, to use a signaling message itself for notifying a neighboring node of a common identifier of a sufficient size which identifies a virtual connection established by the signaling message and connected with the neighboring node, thereby realizing the datalink-layer switching through the established virtual connection.

According to one aspect of the present invention, there is provided a network interconnection apparatus (a router) comprising al memory for storing an identifier for identifying a packet-flow to which a datalink frame belongs and a datalink-layer address of a next-hop node to which the datalink frame belonging to the packet-flow is to be transferred; a receiving unit for receiving a datalink frame from one network; and a transfer unit for 1) examining information described in a prescribed portion (for example, an Organizationally Unique Identifier (OUI) field, whose value is assigned to an organization) within an upper-layer-protocol identifying information region (for example, a Sub-Network Access Point (SNAP) field) of the frame received by the receiving unit, 2) obtaining, when the information examined indicates that a datalink-layer switching (in other words, a frame transfer bypassing the network-layer processing) is to be performed, a datalink-layer address of a next-hop node corresponding to a packet-flow to which the frame received by the receiving unit belongs by referring to the memory based on information described in a remaining portion (for example, a Packet IDentifier (PID) field, which can be individually used according to a protocol created by the organization acquired the above OUI) other than the prescribed portion within the upper-layer-protocol identifying information region, 3) writing the datalink-layer address obtained into a destination address region of the frame, and 4) outputting the frame to another network.

With this arrangement, the information indicating whether the datalink-layer switching (cut-through transfer) is to be performed, and the identifier to be used in this datalink-layer switching, both can be carried while being included in the upper-layer-protocol identifying information region of the datalink frame, and then the length of the network protocol data (payload of the MAC frame) can be fixed irrespective of whether the datalink frame is to be transferred by the datalink-layer switching or the conventional network-layer processing. This eliminates the necessity of re-adjusting or modifying the maximum packet size, on performing the cut-through transfer. Also, regardless of whether the datalink-layer switching or the conventional network-layer processing is performed, the datalink-layer address (for example, the MAC address) of the source node (its own MAC address for the frame-outputting router/host) and the datalink-layer address of the next-hop node are written into the address regions of the datalink frame. That is, it is unnecessary for the node or the bridge to learn additional address information specially for the datalink-layer switching. As a whole, the cut-through transfer can be realized more easily and efficiently according to the present invention.

Information for identifying a packet-flow to which each datalink frame belongs may be referred to as a "label". According to the principle of the present invention, a label may be formed by a destination MAC address and the above-described PID field, or by a source MAC address and the PID field. By exchanging a message for correlating the label and the packet-flow represented by the label between the router and an upstream node, the router is able to store in the memory the correlation between the identifier (the label or a part of the label) for identifying the packet-flow and the datalink-layer address of the next-hop node toward which the frame of the packet-flow is to be transferred.

In a case (I) where the label is formed by the destination MAC address and the PID field, the information described in the PID field alone is sufficient to perform datalink-layer switching by identifying in the datalink layer the packet-flow to which the received frame belongs.

The above-described label is assigned between the router and the upstream node. If another label is assigned between the router and a downstream node in the case (I), the memory of the router may further store another identifier (downstream identifier) for allowing the next-hop (downstream) node to identify the packet-flow in the datalink layer in correspondence with the aforementioned identifier (upstream identifier) for the router to identify the packet-flow. This another identifier and the MAC address of the next-hop node form a downstream label. The transfer unit of the router may also write information indicating that a datalink-layer switching is to be performed into the prescribed portion (for example, the OUI field) in the upper-layer-protocol identifying information region of the frame, and also write the above another identifier into the remaining portion (for example the PID field) in the upper-layer-protocol identifying information region of the frame.

In this case (I), if there are a plurality of upstream nodes, the information described in the PID field may preferably be stored so that each packet-flow transferred from each upstream node is uniquely identified only by referring to the information of the PID field.

In a case (II) where the label is formed by the source MAC address and the PID field, not only the information described in the PID field but also the source MAC address (this combination forms an upstream label) are used in performing datalink-layer switching by identifying in the datalink layer the packet-flow to which the received frame belongs. That is, the transfer unit may refer to the memory by utilizing, as the identifier, a combination of the information stored in the remaining portion of the upper-layer-protocol identifying information region of the frame and the datalink-layer address of the previous-hop (upstream) node described in the source address region of the frame.

If another label is assigned between the router and a downstream node in the case (II), the memory of the router may further store another identifier (downstream identifier) for allowing the next-hop (downstream) node to identify the packet-flow in the datalink layer in correspondence with the aforementioned identifier (upstream identifier) for the router to identify the packet-flow. This another identifier and the MAC address of the router form the downstream label. The transfer unit of the router may also write information indicating that a datalink-layer switching is to be performed into the prescribed portion (for example, the OUI field) in the upper-layer-protocol identifying information region of the frame, write the above another identifier into the remaining portion (for example, the PID field) in the upper-layer-protocol identifying information region, and also write a datalink-layer address of the router into the source address region of the frame.

In this case(II), if there are a plurality of upstream nodes, the information described in the PID field may preferably be stored so that each packet-flow transferred from each upstream node is uniquely identified by a combination of the information of the PID field and the source MAC address.

According to another aspect of the present invention, there is provided a network interconnection apparatus (a router) comprising a receiving unit for receiving a signaling message for establishing a first virtual connection from a previous-hop node; a first registering unit for 1) examining information described in a prescribed portion (for example, the OUI field) of a network-layer-protocol identifying information region (for example, the SNAP field in a Broadband Low Layer Information (B-LLI) L3 field) of the signaling message received by the receiving unit, and
2) registering, when the information examined indicates that a datalink-layer switching (in other words, a frame transfer bypassing the network-layer processing) is to be performed, a first connection identifier (for example, a Virtual Connection IDentifier (VCID)) for identifying the first virtual connection in common with the previous-hop node by extracting information described in a remaining portion (for example, the PID field) other than the prescribed portion within the network-layer-protocol identifying information region; a second registering unit for
3) exchanging with the previous-hop node a flow-notifying message for correlating the first connection identifier and a packet-flow to be transferred through the first virtual connection, and
4) registering a correspondence between the first virtual connection and a second virtual connection to a next-hop node of the packet-flow indicated by the flow-notifying message; and a transfer unit for transferring a frame received from the first virtual connection onto the second virtual connection by referring to the correspondence registered.

With this arrangement, by referring to the network-layer-protocol identifying information region in a received signaling message for establishing a virtual connection between the router and a neighboring node, the router is able to determine whether this virtual connection is to be established for the purpose of the datalink-layer switching (cut-through transfer) or for another purpose (for example, a network-layer transfer such as Classical IP over ATM). The signaling message also contains a sufficient length of a connection identifier (for example, a VCID) enabling both the router and the neighboring node to identify the virtual connection for the datalink-layer switching in common. Thus, by exchanging with the upstream node a flow-notifying message for correlating the virtual connection represented by the VCID (a kind of "label") notified by the signaling message and the corresponding packet-flow, the router is able to perform datalink-layer switching between the upstream virtual connection, which is dedicated to the packet-flow notified by the flow-notifying message, and a downstream virtual connection onto which this packet-flow is to be transferred.

If it is desired that the downstream virtual connection also be dedicated to the aforementioned packet-flow, the router may further comprise a transmitting unit for transmitting, in order to establish the second virtual connection to the next-hop node, a signaling message in which information indicating that the datalink-layer switching is to be performed is described in the prescribed portion (for example, the OUI field) of the network-layer-protocol identifying information region, and in which the second connection identifier for identifying the second virtual connection in common with the next-hop node is described using the remaining portion (for example, the PID field) of the network-layer-protocol identifying information region. The second registering unit may also transmits to or receives from the next-hop node a flow-notifying message for correlating the second connection identifier and the packet-flow to be transferred through the second virtual connection.

According to this second aspect of the present invention, as well as the first aspect of the present invention, the label (VCID) may be formed by a destination link address (for example, a destination ATM address) of the signaling message and the above-described PID field. Alternatively, the label (VCID) may be formed by a source link address (for example, a source ATM address) and the above-described PID field.

Here, only part (for example, the MAC address, which is uniquely assigned to the terminal) of the ATM address may be employed as the link address which constitutes the label.

In the router which may receive signaling messages containing different address formats, the address format type (which indicates whether the destination/source link address of the signaling Message is, for example, the ATM address or the E.164 address) may be included in the link address which constitutes the label.

In a case (I) where the destination link address is utilized in the label (VCID), the first registering unit of the router may register Was the first connection identifier the information in the PID field alone, or a combination of the information in the PID field and its own link address (which is described in the destination link address field of the signaling message from the upstream node).

If a downstream dedicated virtual connection is to be established in the case (I), the router determines as the second connection identifier a combination of a link address of the downstream node and information in the PID field which are to be written in the signaling message to the downstream node.

In a case (II) where the source link address is utilized in the label (VCID), the first registering unit may register as the first connection identifier a combination of the information described in the PID field and a link address of the upstream node (which is described in the source link address field of the signaling message from the upstream node).

If a downstream dedicated virtual connection is to be established in the case (II), the router may write its own link address into the source link address field of the signaling message to the downstream node as constituting the second connection identifier.

According to the first aspect of the present invention, datalink-layer switching is performed by reading the label or a part of the label. On the other hand, according to the second aspect of the present invention, datalink-layer switching may be performed, not by reading the VCID (label), but by reading an identifier described in the header of the datalink frame transferred through the virtual connection, for example, VPI/VCI (which will be converted at a datalink switch interposed on the virtual connection connecting the neighboring nodes). Accordingly, the second registering unit may register, as the correspondence between the first virtual connection and the second virtual connection, information (for example, VPI/VCI) described in a connection identifying information region of the upstream signaling message for establishing the first virtual connection and information (for example, VPI/VCI) described in a connection identifying information region of the downstream signaling message for establishing the second virtual connection, instead of the first connection identifier and the second connection identifier.

According to the first aspect of the present invention (corresponding to the shared-media network) and the second aspect of the present invention (corresponding to the virtual-connection network), in exchanging a message for correlating a label and a packet-flow represented by the label between neighboring nodes, the same type of message (label) format can be used. This type of label format defined by the principle of the present invention can also be used in a case where the neighboring nodes are connected by a point-to-point physical link that accommodates virtual connections. In this case, the VPI/VCI may be used as a label, and the VPI and VCI may be written into the link address and the PID field, respectively, of the same type of message format.

According to yet another aspect of the present invention, there is provided a frame transfer method comprising the steps of: storing in a memory an identifier for identifying a packet-flow to which a datalink frame from one logical network belongs and a datalink-layer address of a next-hop node in another logical network to which the datalink frame belonging to the packet-flow is to be transferred; receiving from said one logical network a datalink frame in which information described in a prescribed portion of an upper-layer-protocol identifying information region indicates that a datalink-layer switching is to be performed; writing the datalink-layer address obtained from the memory, by using information described in a remaining portion other than the prescribed portion of the upper-layer-protocol identifying information region as the identifier, into a destination address region of the received frame; and transmitting the frame to said another logical network.

According to yet another aspect of the present invention, there is provided a frame transfer method comprising the steps of: receiving a signaling message in which information described in a prescribed portion of a network-layer-protocol identifying information region indicates that a datalink-layer switching is to be performed, the signaling-message for establishing a first virtual connection from a previous-hop node; obtaining a first connection identifier for identifying the first virtual connection in common with the previous-hop node, by using information described in a remaining portion other than the prescribed portion of the network-layer-protocol identifying information region; receiving from and/or transmitting to the previous-hop node a flow-notifying message including the first connection identifier, the flow-notifying message for notifying a packet-flow to be transferred through the first virtual connection; storing in a memory information for switching the first virtual connection with a second virtual connection to a next-hop node of the notified packet-flow; and transferring a frame received from the first virtual connection onto the second virtual connection in accordance with the information stored in the memory.

According to yet another aspect of the present invention, there is provided a computer usable medium having computer readable program code embodied therein for a computer functioning as a network interconnection device which transfers datalink frames from one network to another network, the computer readable program code includes: first computer readable program code for causing said computer to register in a memory an identifier for identifying a packet-flow to which a datalink frame belongs and a datalink-layer address of a next-hop node to which the datalink frame belonging to the packet-flow is to be transferred; second computer readable program code for causing said computer to receive a frame in which information described in a prescribed portion of Ian upper-layer-protocol identifying information region indicates that a datalink-layer switching is to be performed; and third computer readable program code for causing said computer to write the datalink-layer address retrieved from the memory according to information described in a remaining portion other than the prescribed portion of the upper-layer-protocol identifying information region, into a destination address region of the received frame to be transferred.

According to yet another aspect of the present invention, there is provided a computer usable medium having computer readable program code embodied therein for a computer functioning as a network interconnection device which transfers datalink frames from a first virtual connection onto a second virtual connection, the computer readable program code includes: first computer readable program code for causing said computer to receive a signaling message in which information described in a prescribed portion of a network-layer-protocol identifying information region indicates that a datalink-layer switching is to be performed, the signaling message for establishing the first virtual connection from a previous-hop node; second computer readable program code for causing said computer to obtain a first connection identifier for identifying the first virtual connection in common with the previous-hop node, by using information described in a remaining portion other than the prescribed portion of the network-layer-protocol identifying information region; third computer readable program code for causing said computer to exchange with the previous-hop node a flow-notifying message including the first connection identifier, the flow-notifying message for notifying a packet-flow to be transferred through the first virtual connection; and fourth computer readable program code for causing said computer to register information for switching the first virtual connection with a second virtual connection to a next-hop node of the notified packet-flow.

Other features and advantages of the present invention will become apparent from the following description taken in conjunction with the accompanying-drawings.

Both the foregoing general description and the following detailed description provide examples consistent with this invention and explain how to make and use systems, methods, and articles of manufacture consistent with the invention. These descriptions do not restrict the claimed invention.

BRIEF DESCRIPTION OF THE DRAWINGS

FIG. 7 illustrates an example of the configuration of a next-hop information table;

FIG. 8 illustrates an example of the configuration of a datagram flow table;

FIG. 16 illustrates an example of the configuration of a switch table of an ATM switch; and FIG. 17 illustrates another example of the format of the cut-through label identifier.

DESCRIPTION OF THE PREFERRED EMBODIMENTS

Figure 1:
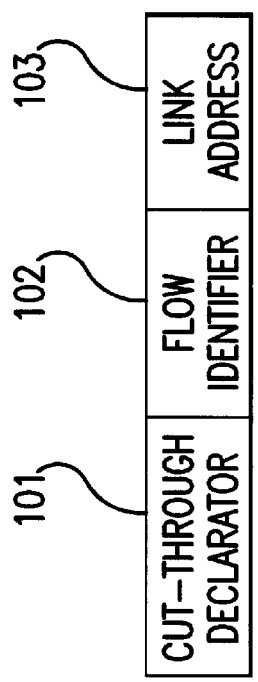
FIG. 1 illustrates-an example of the format of a cut-through label identifier according to an embodiment of the present invention.

FIG. 1 illustrates an example of the format of a cut-through label identifier used in achieving the cut-through transfer function provided in a router according to an embodiment of the invention. The cut-through label identifier is formed of a cut-through declarator 101, a flow identifier 102, and a link address 103.

The cut-through declarator 101 represents, that the frame belongs to a packet flow to be transferred by the cut-through scheme rather than by using the ordinary network-layer transfer scheme. As the cut-through declarator 101, the Organizationally Unique Identifier (OUI) defined by the IEEE802 committee may be used. The flow identifier 102 is used for identifying in the datalink layer the packet flow that is to be transferred by the cut-through transfer scheme. The link address 103 is used for identifying a neighboring (upstream or downstream) node on the path on which the packet flow is transferred by the cut-through transfer scheme. As the link address 103, the MAC address defined by the IEEE802 committee may be used.

The cut-through label identifier may be used as a label in a label distribution protocol, such as a Virtual Connection IDentifier (VCID) in a Flow Attribute Notification Protocol (FANP) (See IETF Internet Draft draft-rfced-info-nagami-00.txt), or a Tag in a Tag Distributed Protocol (TDP) (See IETF Internet Draft draft-rekhter-tagswitch-arch-00.txt), both protocols being exchanged by the nodes having a cut-through function.

Among the elements forming the cut-through label identifier, the cut-through declarator 101 is a value which can be shared by all the cut-through label identifiers. Accordingly, the cut-through declarator 101 may not be included in a message of the aforementioned protocol, and even if it is included, it is not essential that the cut-through declarator 101 be used for identifying the cut-through label (identifying the packet flow in the datalink layer).

It is also not necessary that the link address 103 be used for identifying the cut-through label if the value of the flow identifier 102 is determined in such a manner that the receiving router or host can uniquely identify the packet flow in the datalink layer only by referring to the flow identifier 102. Conversely, if the receiving router or host is unable to uniquely identify the packet flow only by referring to the flow identifier 102, both the link address 103 and the flow identifier 102 are used for identifying the cut-through label.

Figure 2:
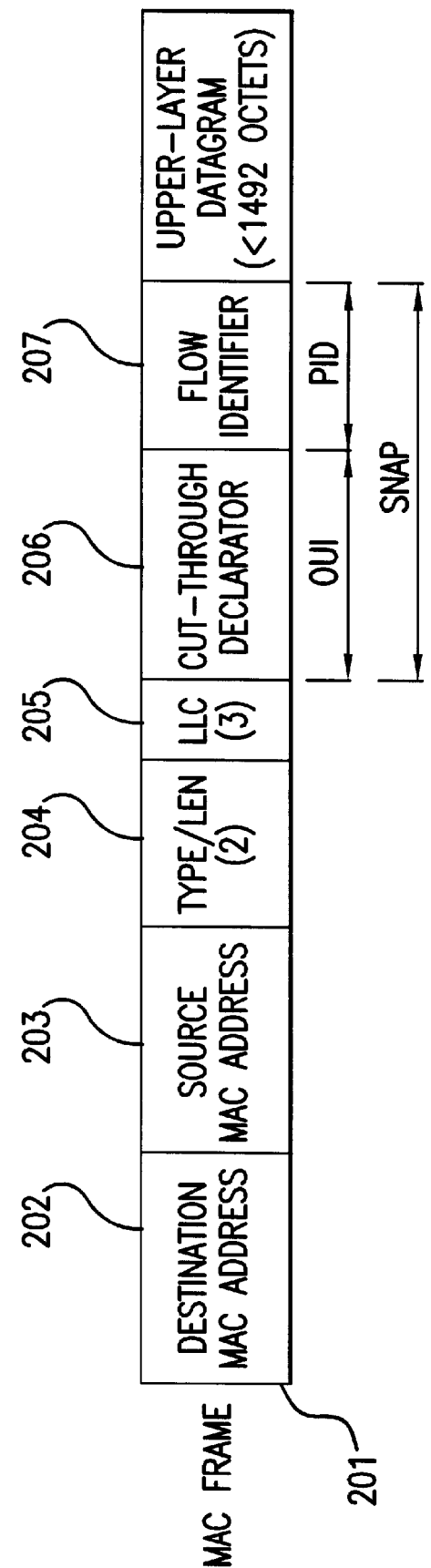
FIG. 2 illustrates an example of the frame format employed when the cut-through label identifier shown in FIG. 1 is used in an 802.3 frame.

FIG. 2 illustrates an example of the frame format employed when the cut-through label identifier shown in FIG. 1 is utilized in an 802.3 frame, which is used in, for example, the Ethernet.

A MAC frame 201 complies with the standard format of a MAC frame, which is referred to as the "802.3 frame" used in, for example, the Ethernet. In the field of a destination MAC address 202, the MAC address of the next-hop router/host to which this MAC frame is to be transferred is described. In the field of a source MAC address 203, the MAC address of the router/host which is transmitting this MAC frame is described.

The link address 103 described in the cut-through label identifier shown in FIG. 1 corresponds to either the destination MAC address 202 or the source MAC address 203. Which MAC address 202 or 203 corresponds to the link address 103 is determined by the protocol implementing the cut through function provided in the nodes. For example, if the protocol has been determined in such a manner that the label is assigned by the receiving (downstream) node, the link address 103 may correspond to the destination MAC address 202. If the protocol has been determined in such a manner that the label is assigned from the transmitting (upstream) node, the link address 103 may correspond to the source MAC address 203. Alternatively, regardless of whether the transmitting node or the receiving node assigns the label, the source MAC address 203 may always be used on the following occasions: for example, during point-multipoint communications, such as multicast communications, the receiving nodes identify the same multicast flow by the same identifier. Alternatively, regardless of whether the transmitting node or the; receiving node assigns the label, the destination MAC address 202 may always be used, considering that a shorter identifier is desirable in performing the datalink-layer switching.

A TYPE/LEN field 204 is used for describing the protocol information or the length of a MAC frame. If the value filled in the TYPE/LEN field 204 is greater than the maximum length of the MAC frame that can be transferred, it is interpreted that the MAC frame is a frame defined as the Ethernet Version 2, and that a protocol identifier is described in the TYPE/LEN field 204. Conversely, if the value filled in the TYPE/LEN field 204 is not greater than the maximum length of the MAC frame that can be transferred, the MAC frame is an 802.3 frame, and the length of the MAC frame is described in the TYPE/LEN field 204.

A Logical Link Control (LLC) header 205 is a three-byte identifier representing the upper-layer service defined by the IBEE802 committee. Generally, in the network protocol, such as the IP, the header having a value, such as AA.AA.03, which is hexadecimal representing the Subnetwork Access Point (SNAP), is used. A SNAP header (having an OUI field 206 and a packet identifier (PID) field 207) is a five-byte upper-layer protocol identifier to be added when the LLC header 205 represents AA.AA.03 in hexadecimal.

The OUI field 206, which indicates a three-byte field starting from the front end of the SNAP header, is defined by the IEEE802 committee and is assigned to an organization. The PID field 207 preceded by the OUI field 206 can be freely used by the organization which has acquired the OUI value. The above-described SNAP is similar to a system in which the first three bytes of a MAC address are assigned to a vender, and the remaining bytes of the MAC address are provided within the vender.

In the MAC frame used in this embodiment, a cut-through declarator 206 corresponding to the cut-through declarator 101 shown in FIG. 1 is filled in the OUI field. Since the OUI field includes a cut-through declarator, the router is able to identify, by referring to the OUI field, that a received MAC frame is to be transferred by using the cut-through transfer function.

The PID field, preceded by the OUI field, is a two-byte field for identifying the protocol. The value of the OUI field determines the meaning of the value filled in the PID field. For example, when the OUI field indicates 00.00.00, the value filled in the PID field represents a protocol identifier defined by the Ethernet Version 2.

In the MAC frame used in this embodiment, a flow identifier 207 corresponding to the flow identifier 102 shown in FIG. 1 is filled in the PID field. That is, if the above-described cut-through declarator is filled in the OUI field, the value described in the PID field represents a flow identifier. By referring to the flow identifier 207 (and the link address described in the source MAC address 203 if necessary), the router is able to identify in the datalink layer a packet flow of the received MAC frame which is declared by the cut-through declarator 206 to be transferred by using the cut-through transfer function.

Figure 3:
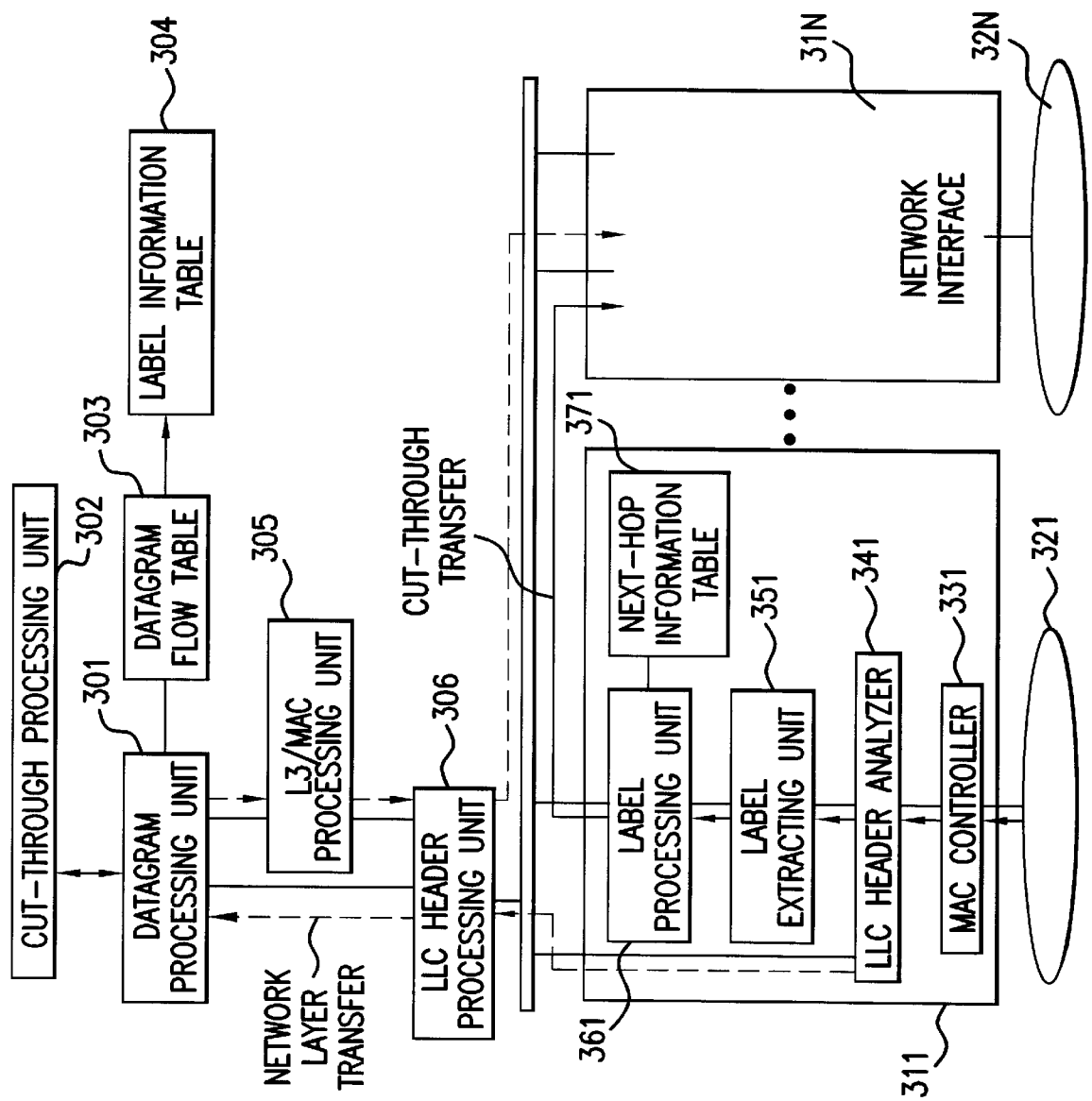
FIG. 3 is a block diagram illustrating an example of the configuration of a router for performing a high-speed transfer operation by using the cut-through label identifier shown in FIG. 1 according to an embodiment of the present invention.

FIG. 3 illustrates an example of the configuration of a router for performing a high-speed transfer operation by using the cut-through label identifier shown in FIG. 1 according to an embodiment of the present invention.

The router constructed in accordance with this embodiment has a plurality of network connecting interfaces 311 through 31N which are respectively connected to networks 321 through 32N. The networks 321 through 32N, which are standardized by the IEEE802 committee, may be the Ethernet (802.3), the token ring (802.5), or the ATM network in which a MAC frame is formed into a cell and is then transferred. A network to which a frame is transferred from this router may be an ATM network which is different from the above type of ATM network; for example, the network in which an IP packet is directly formed into a cell and is then transferred. In this case also, the cut-through transfer operation by the router of this embodiment can be implemented.

A datagram processing unit 301 performs network-layer processing on a packet obtained by assembling the frames received by the respective network interfaces 311 through 31N. More specifically, the datagram processing unit 301 has a function of determining the network layer address of Ia next-hop router/host, and also determining the network interface connected to the next-hop router/host according to the final destination address, such as a destination IP address, of the datagram (packet). If the router transfers all the frames by using the cut-through transfer function which will be explained below, this network-layer transfer (forwarding) function may not be essential.

A cut-through processing unit 302 executes protocol processing required for performing a cut-through transfer operation (datalink-layer switching) by using the cut-through label identifier used in this embodiment. More specifically, by exchanging messages including the cut-through label identifier with the neighboring node, the cut-through processing unit 302 identifies which cut-through label identifier to be used for transferring a specific packet flow by using the cut-through function, and then sets, based on the cut-through label identifier, a next-hop information table 371, a datagram flow table 303, and a label information table 304, all of which will be described later. As the protocol used for this operation, the label distribution protocol such as FANP or TDP may be employed, as noted above.

A datagram flow table 303 is a table to be referred to upon transmitting a datagram (packet) when the router of this embodiment is a starting point of a path on which the cut-through transfer is performed. In contrast, the router of this embodiment which is an intermediate point of the cut-through transfer path uses this table in managing information for appropriately setting the datalink-layer switching. When exchanging the protocol with the neighboring node, the cut-through processing unit 302 writes the relationship between the datagram flow (packet flow) to be transferred and the cut-through label identifier into this table 303. Then, in transmitting the datagram, the datagram processing unit 301 follows the link from the datagram flow table 303 to a label information table 304, which will be described below, based on the datagram flow to be transmitted, thereby obtaining the cut-through label identifier.

The label information table 304 is linked to the datagram flow table 303, and stores the cut-through label identifier identified in common by the cut-through processing unit 302 and the neighboring node. In transmitting the datagram, a MAC frame containing the cut-through identifier is constructed by using the information stored in the label information table 304.

An L3/MAC processing unit 305 determines, during the network-layer datagram transfer operation, the MAC address of the next-hop node according to the network-layer address of the datagram, and also executes Address Resolution Protocol (ARP) processing required for operating the IP on a network such as the Ethernet.

An LLC-header processing unit 306 determines the upper-layer protocol based on the value of the LLC header described in the received MAC frame or the value of the Ethernet-type field designated by the Ethernet Version 2, and then delivers the data to the datagram processing unit 301 or the L3/MAC processing unit 305.

The configuration of each of the network interfaces 311 through 31N is described below by taking the network interface 311 as an example. The network interface 311 is formed of a MAC controller 331, an LLC header analyzer 341, a label extracting unit 351, a label processing unit 361, and a next-hop information table 371.

The MAC frame controller 331, which transmits and receives MAC frames, normally receives MAC frames that are addressed to this router or broadcast MAC frames. The MAC frame controller 331 may receive other MAC frames whose addresses are a group address of a multicast group to which this router belongs.

The LLC header analyzer 341 analyzes an LLC header which may be added in an 802.3 frame or an 802.5 frame, and may analyze a SNAP header depending on the type of frame, thereby determining the upper-layer protocol. The LLC header analyzer 341 makes a determination of whether the value filled in the OUI field of the SNAP header is the same as the cut-through declarator used in this embodiment. If the LLC header analyzer 341 determines that the above value coincides with the cut-through declarator, it transfers the MAC frame to the label extracting unit 351. In contrast, if the above value is different from the cut-through declarator, the LLC header analyzer 341 determines that the MAC frame is to undergo datagram processing, and then transfers it to the LLC-header processing unit 306.

Since the LLC header analyzer 341 and the LLC-header processing unit 306 check the same element in the MAC frame, the LLC header analyzer 341 may incorporate the function of the LLC-header processing unit 306 to directly transfer data to the datagram processing unit 301. In this case, the provision of the LLC-header processing unit 306 is unnecessary. A case where, the LLC-header processing unit 306 is not provided will be explained below.

The label extracting unit 351 extracts a cut-through label identifier, such as the one shown in FIG. 1, in accordance with the destination MAC address or the source MAC address of the MAC frame and the SNAP header information transferred from the LLC header analyzer 341. If the destination MAC address is used as the link address of the cut-through label identifier, only the SNAP header may be extracted, or only the value of the PID field in the SNAP header may be extracted.

The label processing unit 361 searches the next-hop information table 371 by using the value of the extracted cut-through label identifier so as to obtain the information concerning the cut-through label identifier of the next-hop node and/or the output network interface to which the frame is to be transferred. The label processing unit 361 overwrites the MAC header information, LLC header information, and/or SNAP header information if necessary, and directly transfers the MAC frame to the output interface (without passing through the datagram processing unit 301, the cut-through processing unit 302, the datagram flow table 303, the label information table 304, the L3/MAC processing unit 305, and the LLC- header processing unit 306, all of which perform network layer processing).

Figure 4:
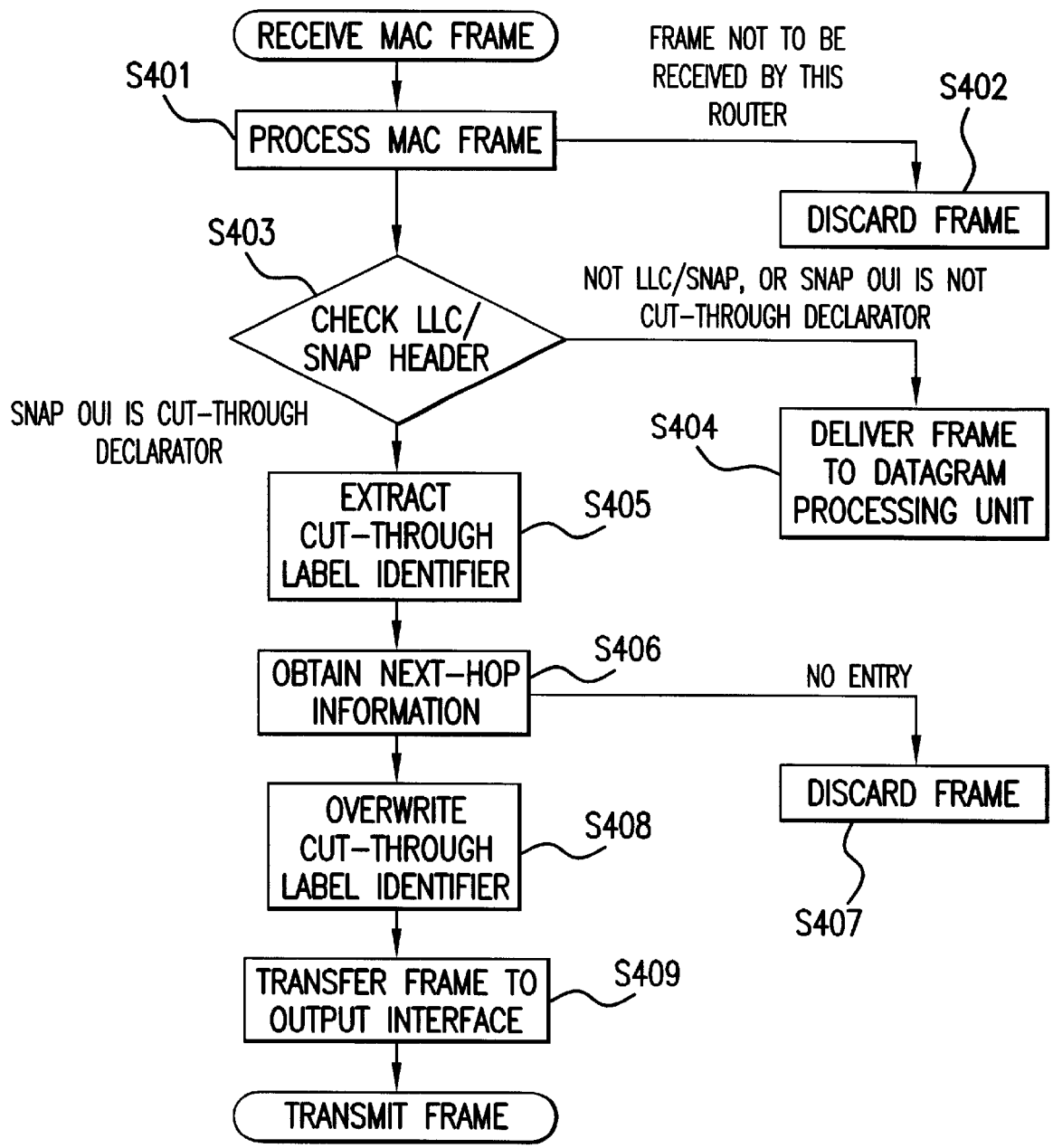
FIG. 4 is a flowchart illustrating an exemplary frame processing executed by the router shown in FIG. 3 by using the cut-through label identifier.

FIG. 4 is a flowchart illustrating an example of frame processing performed by the aforementioned router by using the cut-through label identifier when the source MAC address is used as the link address. A description is given below assuming that a datagram is transferred from the network interface 311 to the network interface 31N.

The network interface 311 receives a MAC frame from the network 321. The MAC controller 331 then processes the MAC frame, such as checking the destination MAC address and performing Cyclic Redundancy Check (CRC). If the destination MAC address of the received MAC frame is to be received by this router, the MAC controller 331 transfers the frame to the LLC header analyzer 341 (step S401). That is, if the destination MAC address of the received frame coincides with the MAC address of this router, or if it is the MAC address of, for example, a multicast frame that is set in the MAC controller 331 as to be received by this router, the MAC controller 331 delivers the frame to the LLC header analyzer 341. In other cases, the MAC controller 331 discards the frame (S402).

The LLC header analyzer 341 analyzes the LLC header written in the MAC frame, and further analyzes a SNAP header if the LLC header represents AA.AA.03 in hexadecimal). The LLC header analyzer 341 then checks whether the cut-through declarator of the cut-through label identifier used in this embodiment is described in the OUI field of the SNAP header (S403). If the outcome of S403 is yes, the LLC header analyzer 341 delivers the MAC frame to the label extracting unit 351 (S405). If the cut-through declarator is not described in the OUI field of the SNAP header, or if the header included in the MAC frame is not an LLC/SNAP header, the LLC header analyzer 341 delivers the MAC frame to the datagram processing unit 301 (S404).

The label extracting unit 351 then extracts the cut-through label identifier by using a combination of the source MAC address, the PID field of the SNAP header, and if necessary, the value of the OUI field of the SNAP header (S405), and transfers the MAC frame to the label processing unit 361. In a system where the destination MAC address is used as the link address, only the PID field of the SNAP header may be extracted (S405).

The label processing unit 361 searches the next-hop information table 371 based on the cut-through label identifier (upstream label identifier) extracted by the label extracting unit 351, thereby obtaining the next-hop information (the destination MAC address and, if already assigned, the downstream cut-through label identifier) (S406). In a system where the destination MAC address is used as the link address, only the downstream cut-through label identifier may be obtained as the next-hop information, and then the link address, the flow identifier, and the cut-through declarator of the downstream cut-through label identifier are respectively written into the destination MAC address field, the PID field, and the OUI field. The MAC address of this router is written into the source MAC address field.

If there is no corresponding entry in the next-hop information table 371 when being searched by the label processing unit 361 (S406), the MAC frame is discarded (S407). In this case, an error message may be sent to the cut-through processing unit 302 operating according to the cut-through processing protocol. In order to prevent this error from actually occurring, the source node of the packet flow preferably transmits a MAC frame of the packet flow in the form of including the cut-through label identifier only after being reported from the downstream node that the next-hop information table has been set based on the messages including the cut-through label identifier exchanged between the source node and the downstream node. Unless being reported from the downstream node, the source node transmits a packet belonging to the packet flow in the form of an ordinary MAC frame not including the cut-through label identifier, so that the downstream node can perform a datagram processing to transfer the frame toward the final destination node.

To avoid such a situation that the MAC frame to be transferred to the next-hop node is disadvantageously discarded in S407 even when a message including the downstream cut-through label identifier has not been exchanged between this router and the next-hop node while a message including the upstream cut-through label identifier has been exchanged between the previous-hop node and this router, the following two methods, for example, are available.

In one method, upon completion of message exchange between this router and the previous-hop node, the entry having the upstream cut-through label identifier as a key is created in the next-hop information table 371. In this table 371, no data (alternatively, information indicating that the corresponding frame is to be transferred to the datagram processing unit 301) is filled in the column of the output interface, and the upper-layer-protocol identifying information, such as the LLC header, is filled in the column of the downstream cut-through label identifier. If the entry of the next-hop information table 371 remains in the above-described state when the table is searched in S406, the MAC frame is delivered to the datagram processing unit 301 according to the upper-layer-protocol identifying information described in the table 371.

In the other method, upon completion of message exchange between this router and the previous-hop node, the entry having the upstream cut-through label identifier as a key is created in the next-hop information table 371. Then, by analyzing the destination network-layer address of a packet flow specified by the upstream cut-through label identifier in the datagram processing unit 301, the output interface to which the MAC frame is to be transferred and the MAC address of the next-hop node are determined. In the next-hop information table 371, the determined output interface and the determined MAC address are filled in the columns of the output interface and the destination MAC address, respectively, and the LLC header and the protocol identifier are written into the column of the downstream cut-through label identifier. Then, the MAC frame having the upstream label identifier corresponding to the above-described entry of the next-hop information table 371 can be processed by S408 and the subsequent steps. According to this method, even if a message has not been exchanged with the next-hop node (a downstream label identifier has not been assigned), datalink-layer switching can be achieved in the router of this embodiment.

After acquiring the next-hop information, in the label processing unit 361, the destination MAC address (MAC address of this router) of the received frame is overwritten by the destination MAC address (MAC address of the next-hop node) determined based on the next-hop information, and the cut-through label identifier (upstream label) of the received frame is replaced by the cut-through identifier (downstream label) determined based on the next-hop information. That is, the link address (i.e., the MAC address of this router) is written into the source MAC address, and the flow identifier of the downstream label land the cut-through declarator are written into the PID field and the OUI field, respectively (S408). Then, the MAC frame is transferred to the output network interface 31N (S409). The output network interface 31N can transmit (output) this MAC frame to the network 32N as it is.

According to the aforementioned processing of cut-through transfer, frames can be transferred by datalink-layer switching without requiring the processing in the datagram processing unit 301.

Figure 5:
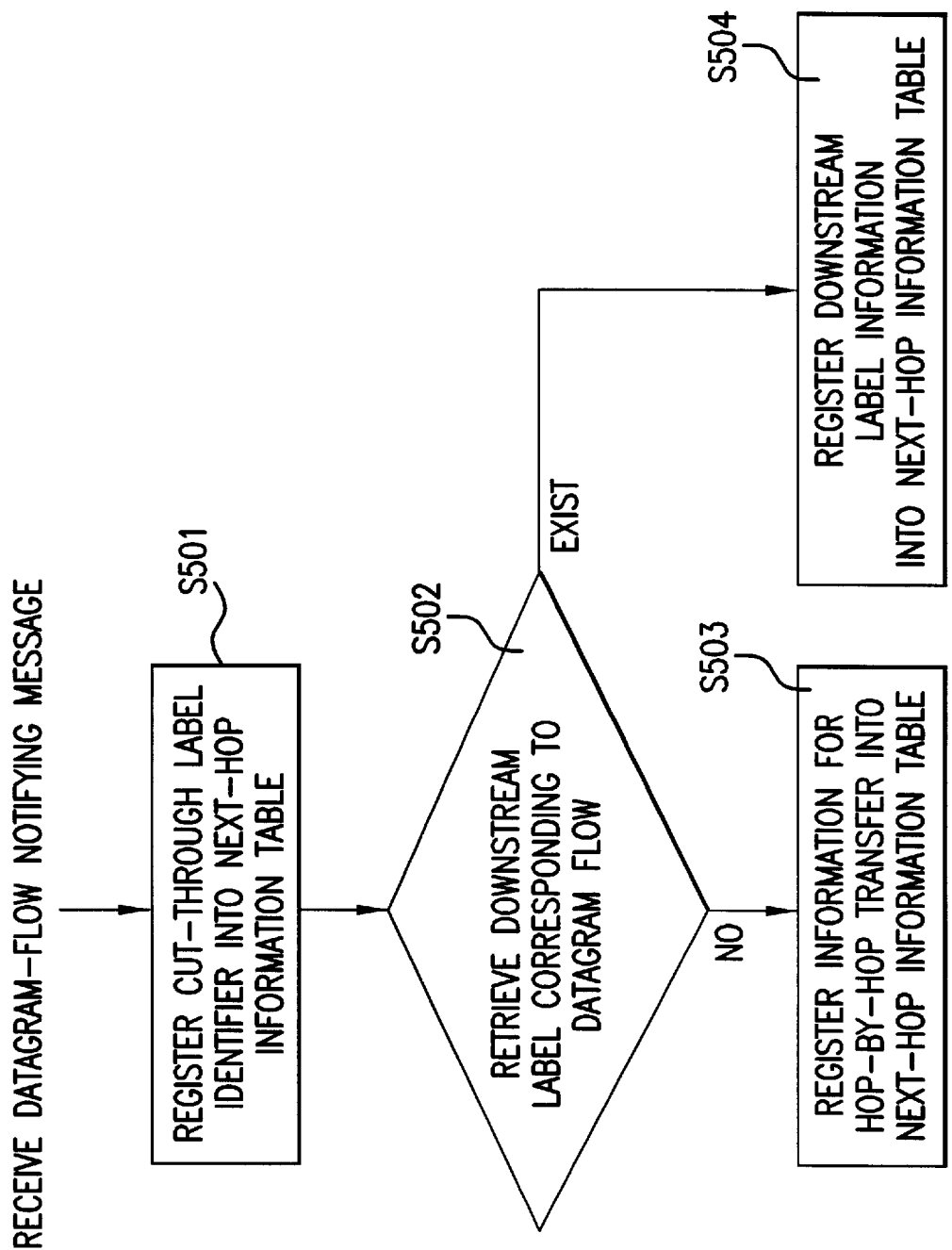
FIG. 5 is a flowchart illustrating an exemplary protocol processing for the cut-through transfer executed by the router shown in FIG. 3 as a receiving side.

FIG. 5 is a flowchart illustrating cut-through protocol processing executed in the router using the cut-through label identifier of this embodiment when the router receives the protocol message.

A description is given below, as an example, of the registration of cut-through label identifier information when a label distribution protocol message is received through the LLC header processing 306 and the network interface 311, and a datagram flow represented by this message is to be transferred from the network interface 311 to the network interface 31N.

The datagram-flow (packet-flow) notifying message received by the network interface 311 passes through the datagram processing unit 301 and reaches the cut-through processing unit 302. The message includes the datagram-flow (packet-flow) identifying information and the corresponding cut-through label identifier. The cut-through processing unit 302 extracts the above items of information from the message.

An entry in which the cut-through label identifier contained in the message is registered as input-side (upstream) information is then created in the next-hop information table 371 stored in the network interface 311 (S501). By using the datagram-flow identifying information as a key, the datagram flow table 303 is searched to check whether an output-side label identifier is registered corresponding to the datagram flow (whether a cut-through label has already been assigned on downstream of the datagram-flow path) (S502).

If there is no corresponding entry in the datagram flow table 303, it means that the downstream cut-through label identifier has not been assigned. Thus, the next-hop information for hop-by-hop transfer (network-layer transfer) may be registered as output-side (downstream) information in the created entry in the next-hop information table 371 stored in the network interface 311 (S503). Alternatively, the next-hop information for cut-through transfer can be registered even if a cut-through label has been assigned only on upstream of the datagram-flow path as already explained.

If there is the corresponding entry in the datagram flow table 303, the downstream cut-through label identifier is obtained from the label information table 304 by following the link from the entry in the datagram flow table 303, and then is registered as the output-side (downstream) information in the created entry in the next-hop information table 371 stored in the network interface 311 (S504).

The cut-through label identifier that is included in the received datagram-flow notifying message is registered corresponding to the datagram flow also in the datagram flow table 303 as an input-side label identifier.

According to the aforementioned processing, the registration using a label distribution protocol message received from the upstream (previous-hop) node is completed, and it is now ready to receive a MAC frame having the upstream cut-through label.

Figure 6:
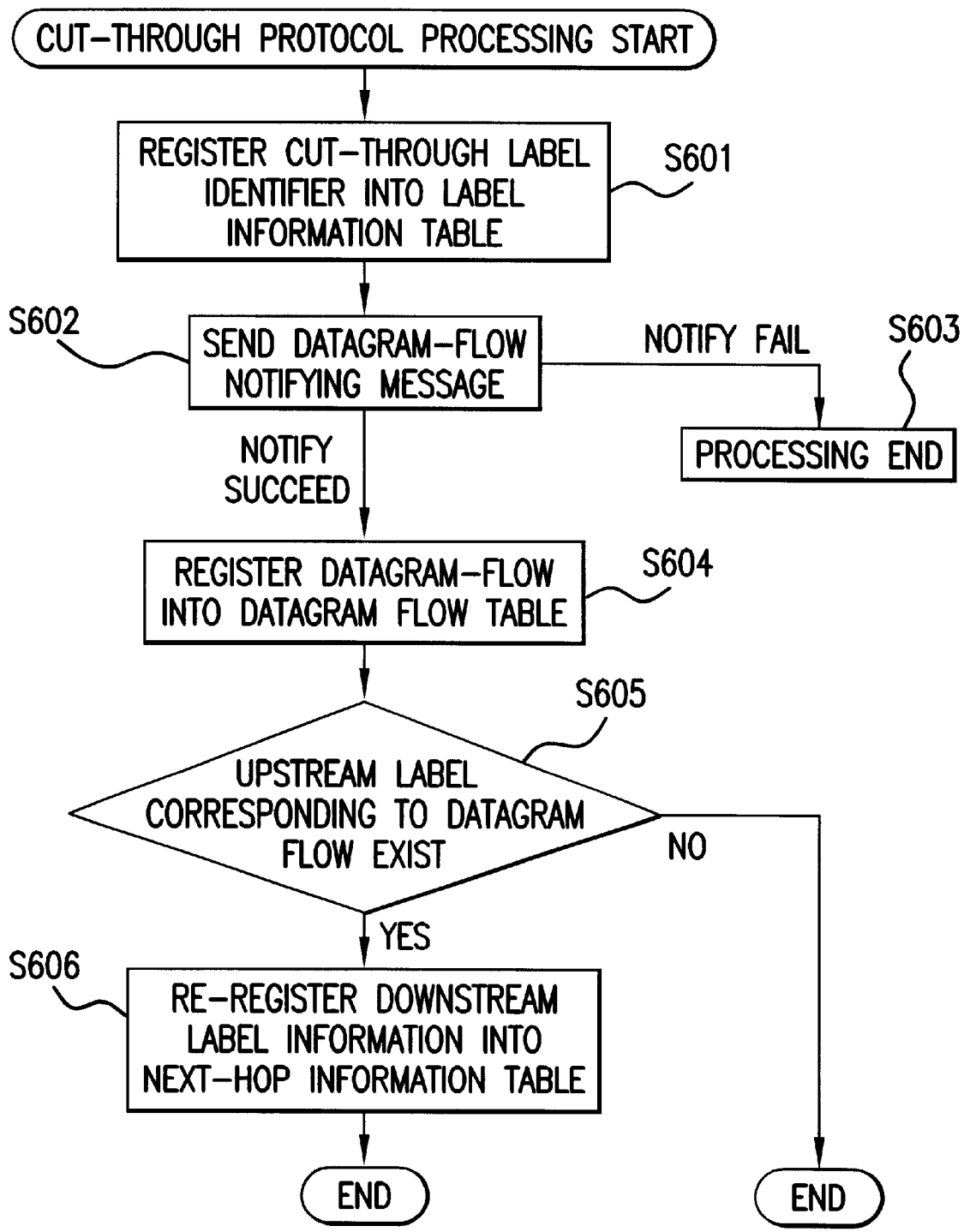
FIG. 6 is a flowchart illustrating an exemplary protocol processing for the cut-through transfer executed by the router shown in FIG. 3 as a transmitting side.

FIG. 6 is a flowchart illustrating cut-through protocol processing executed in the router using the cut-through label identifier of this embodiment when the router transmits the protocol message.

A description is given, as an example, of the registration of cut-through label identifier information when a label distributions protocol message is transmitted through the network interface 31N in order to transfer a datagram flow from the network interface 311 to the network interface 31N.

Upon starting a processing for notifying the next-hop node of a new cut-through label and a datagram flow to be transmitted using the new cut-through label, the cut-through processing unit 302 registers this cut-through label identifier in the label information table 304 (S601). The cut-through processing unit 302 then sends to the next-hop node a datagram-flow notifying message including this cut-through label identifier and the corresponding datagram-flow identifying information (S602).

The datagram-flow notifying message can be sent, for example, when a specific datagram passes through the datagram processing unit 301 or when the next-hop node corresponding to a destination network-layer address is registered in the datagram processing unit 301 according to the network-layer routing protocol. The former scheme is called flow-driven, and the latter scheme is called topology-driven. If the sending of the datagram-flow notifying message has failed, the cut-through protocol processing is ended due to this failure (S603).

If the sending of the datagram flow message has been successful, the relationship between the datagram flow and the cut-through label identifier as an output-side label identifier) is registered in the datagram flow table 303 (S604). Then, it is checked in the datagram flow table 303 whether the entry corresponding to the datagram flow has an input-side label identifier (whether a cut-through label has already been assigned on upstream of the datagram-flow path) (S605). If the result of S605 is yes, the next-hop information based on the newly assigned output-side cut-through label identifier is set as the output-side (downstream) information in the next-hop information table 371 stored in the network interface 311, since the old next-hop information may have been previously and would thereby be replaced (S606). If it is found in S605 that there is no upstream label in the datagram flow table 303, the process is ended.

In the foregoing description, each router triggers the assignment of the cut-through label on its downstream path (i.e., the upstream node allocates the label). In the present invention, however, each router may trigger the assignment of the cut-through label on its upstream path (i.e., the downstream node allocates the label). Alternatively, the upstream node may request the downstream node to assign the label, and in response to this request, the downstream node may allocate the label.

An example of the configuration of the next-hop information table 371 is shown in FIG. 7. The information on the next-hop router/host is described as the output-side information (output interface 702, next-hop MAC address 703, downstream cut-through label identifier 704) in this table 371, and can be obtained by searching this table 371 and then by referring to the entry having the (input-side/upstream) cut-through label identifier 701 corresponding to the cut-through label identifier of the received frame.

In the next-hop information table 371, a search is conducted by using at least a part of the cut-through label identifier as a key. As discussed above, the cut-through label declarator, and the destination MAC address, if it is used as the link address, are not essential as the key. This search can be conducted even in a table not having a cut-through label identifier column 701, depending on the search method.

An output interface (I/F) column 702 indicates the network interface to which the received frame is to be transferred.

A next-hop MAC address column 703 stores the information of the MAC address of the next-hop node. In a system where the link address of the cut-through label identifier is described in the source MAC address field, a value of this column 703 in the corresponding entry is written into the destination MAC address field of the frame to be transmitted. In a system where the link address of the cut-through label identifier is described in the destination MAC address field, this column 703 may not be provided in the table 371, since the value to be written into the destination MAC address field of the frame to be transmitted may be stored in a part of a downstream cut-through label identifier column 704.

As the link address of the cut-through label identifier used in this embodiment, the MAC address uniquely provided for each router or host can be used as it is cunmodified). Thus, in the MAC frame having the cut-through label identifier, as well as in a MAC frame to be transferred by the network-layer processing, the source MAC address in the received frame is replaced by the MAC address uniquely provided for this transmitting router, while the destination MAC address-in-the received frame is replaced by the MAC address uniquely provided for the next-hop node. The information required for replacing the MAC addresses is stored in the next-hop MAC address column 703 and/or the downstream cut-through label identifier column 704.

The downstream cut-through label identifier column 704 stores the output-side cut-through label identifier. If the next-hop node is a router that is not compatible with the MAC frame (cut-through MAC frame) format used in this embodiment, or is a final destination host, encapsulation information (such as LLC header) and, if necessary, a MAC address to be used in the network-layer datagram transfer are desirably set in the downstream cut-through label identifier column 704. That is, according to the LLC header set in the next-hop information table 371, the router transfers a MAC frame whose format is conventional to the next-hop node which is not compatible with the MAC frame containing the cut-through label identifier. This enables the router of this embodiment to perform the cut-through transfer operation even if the next-hop node does not support the MAC frame format adopted in this embodiment.

Also, if it is required to deliver the received frame to the upper layer inside a certain next-hop node, the router (which is located at a previous-hop of the certain next-hop node) transforms the MAC frame including the cut-through label identifier received from the upstream node into a MAC frame whose format is conventional, as discussed above, and then transfers the converted MAC frame to the next-hop node. In this way, even if the MAC frame having the cut-through label identifier received by the router does not include the upper-layer-protocol identifying information, the certain next-hop node can receive the MAC frame including the upper-layer-protocol identifying information and can execute an appropriate upper-layer processing on the received frame.

If the router of this embodiment is a starting point of a path on which the cut-through transfer is performed, the MAC frame including the cut-through label identifier is transmitted from the datagram processing unit 301. For this operation, the label information table 304 and the datagram flow table 303 are referred to. The label information table 304 may be formed of, for example, the output I/F column 702, the next-hop MAC address column 703, and the downstream cut-through label identifier column 704 of the next-hop information table 371 shown in FIG. 7.

An example of the datagram flow table 303 used for obtaining the cut-through label corresponding to the datagram-flow identifying information is shown in FIG. 8.

In the datagram flow table 303, a search is conducted by using the datagram-flow identifying information as a key. This search can be conducted even in a table not having a datagram flow column 801, depending on the search method. The datagram-flow identifying information is, for example, one of or any combination of: the destination IP address (may be the network address or the host address), the source IP address, the upper-layer protocol information, the destination upper-layer protocol port information (e.g., the Transmission Control Protocol (TCP) port number), and the source upper-layer protocol port information, all of which are included in the datagram to be transferred. Alternatively or additionally, the egress router corresponding to the destination IP address in the domain to which the router of this embodiment belongs may be used as the datagram-flow identifying information.

An output-side cut-through label identifier column 802 (corresponding to the downstream cut-through label identifier column 704) stores the information concerning the cut-through label identifier assigned on downstream of the router of this embodiment. When the datagram is actually transmitted, the label information table 304, as well as the datagram flow table 303, is searched to obtain information such as the next-hop MAC address. Considering that the datagram transfer rate may be decreased by searching both the datagram flow table 303 and the label information table 304, only the information indicating the position of the entry of the label information table 304 may be set in the output-side cut-through label identifier column 802.

An input-side cut-through label identifier column 803 (corresponding to the cut-through label identifier 701 shown in FIG. 7) stores the information concerning the cut-through label identifier assigned on upstream of the router of this embodiment. The input cut-through label identifier is not used for the actual datagram transmitting operation, but may be used in exchanging the datagram-flow notifying messages including the cut-through label for checking the presence of the upstream label corresponding to the entry. The label information table 304 may be provided with an area corresponding to the cut-through label identifier column 701 shown in FIG. 7, and the information indicating the position of the entry of the label information table 304 may be set in the datagram flow table 303.

Figure 9:
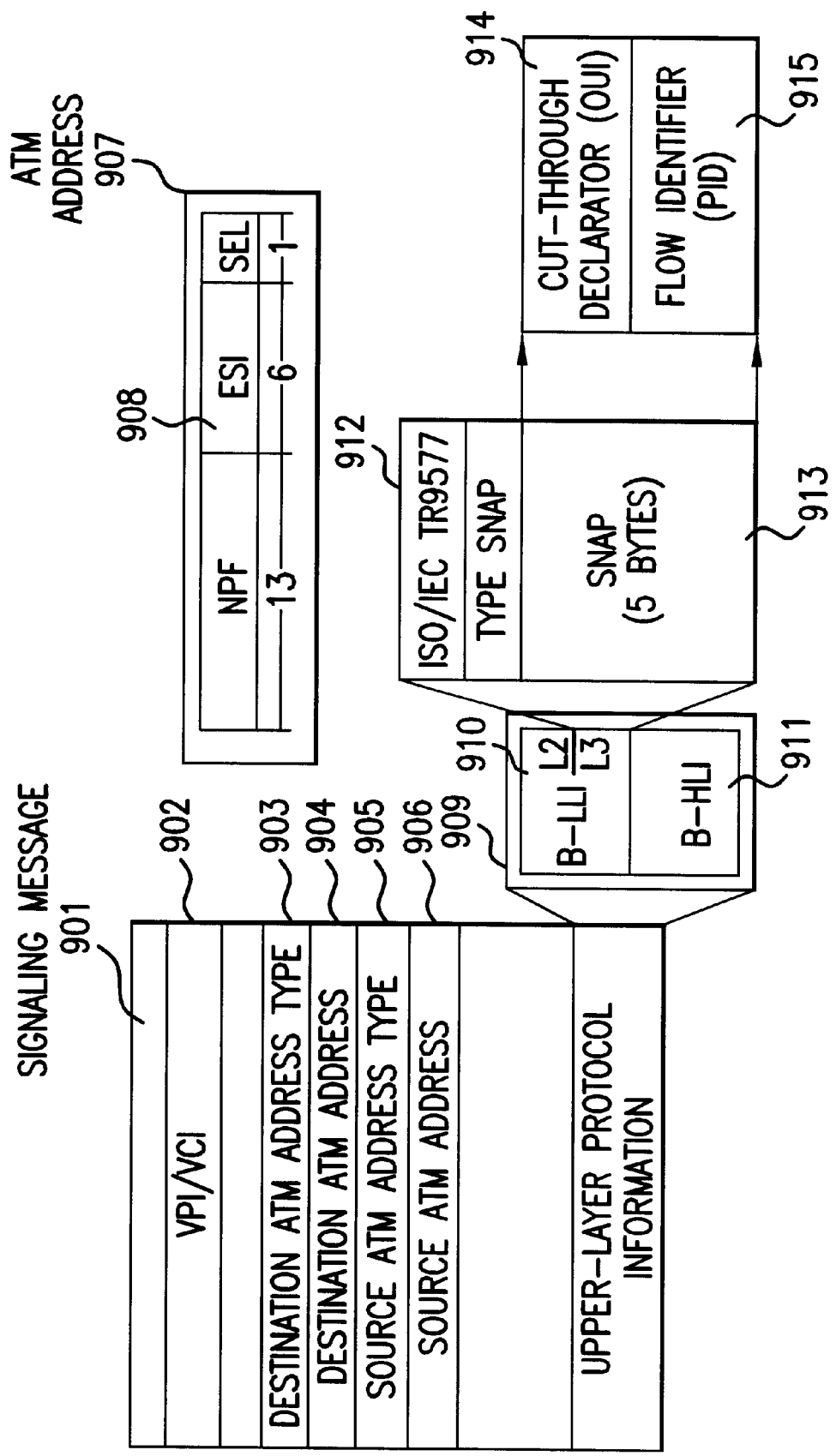
FIG. 9 illustrates an example of the format of an ATM signaling message using the cut-through label identifier shown in FIG. 1.

FIG. 9 shows an example of the format of a signaling message when the cut-through label identifier shown in FIG. 1 is assigned to a Switched Virtual Connection (SVC) of the ATM. The SVC of the ATM is a virtual connection that can be dynamically established in the ATM network, land a technique which is called "signaling" is used for this establishment.

When setting or releasing the SVC, a signaling message 901, having a format defined by the ATM Forum User-Network Interface (UNI) Specification, is transferred by using another type of virtual connection, which is referred to as a "signaling VC".

A VPI/VCI 902 is a field for storing the VPI/VCI of the SVC to be established by this signaling message. The router or the host is then able to write the VPI/VCI into the header of an ATM cell to be transmitted. That is, the ATM cell can be transferred through the established SVC. It should be noted, however, that the VPI/VCI value stored in this field 902 in the router or the host (for example, the upstream node) that has transmitted a signaling request may be the same as or different from that in the router or the host (for example, the downstream node) that has received the signaling request. The transmitting (upstream) node and the receiving (downstream) node is thus unable to identify the same connection merely by referring to the VPI/VCI field 902.

A destination ATM address type 903 is a field for storing the address type of the destination ATM address of the correspondent node to which a SVC will be established by executing signaling processing from the node which has initiated signaling. The destination ATM address type 903 is used when a plurality of address formats are supported, as represented by the UNI Specification 3.1 defined by the ATM Forum. The Network Service Access Point (NSAP) address format or the E.164 address format may be employed. It is not essential that the destination ATM address type 903 be provided in a network, such as a public network or the UNI 3.0, where a single type of addresses is used.

A destination ATM address 904 is a field for storing the destination ATM address of the correspondent node. The destination ATM address 904 complies with the address format that can be identified by an ATM switch which will relay ATM cells on the established SVC.

A source ATM address type 905 is a field for storing the address type of the node which has started signaling. This field 905 is employed when a plurality of address types are supported, as indicated by, for example, the UNI Specification 3.1 defined by the ATM Forum. The NSAP address format or the E.164 address format may be employed. The source ATM address type 905 may not be provided in a network, such as a public network or the UNI 3.0, where a single type of addresses is used.

A source ATM address 906 is a field for storing the ATM address of the router or the host which has initiated signaling for establishing the SVC.

An ATM address 907 illustrates the above-described destination ATM address or the source ATM address having an NSAP address format. The address 907 has 20 bytes, and an End System Identifier (ESI) field 908 occupied from the 14th byte to the 19th byte uses the IEEE802 address, which has the same value as the MAC address. That is, the ESI field 908 of the source address or the destination address can be employed as the link address 103 of the cut-through label identifier shown in FIG. 1.

Signaling upper-layer protocol information 909 is designated by the node that has initiated signaling, and is to be reported to the correspondent node normally as it is, i.e., without being processed in an ATM switch. For example, in the ATM Forum, Broadband Low Layer Information (B-LLI) 910 or Broadband High Layer Information (B-HLI) 911 may be used.

It is not always the case that the upper-layer protocol information 909 should be transferred without being processed in the ATM switch, and if the undefined information is found by the ATM switch, the upper-layer protocol information may be discarded in the ATM switch, and may not be transferred to the correspondent node.

A signaling information item 912 represents an ISO/IEC TR9577 parameter among the L3 information items (which describes the network-layer protocol information) contained in the B-LLI 910. The SNAP is used as the type of signaling parameter, and a five-byte header 913 is contained therein.

The SNAP header 913 is similar to the counterpart represented by the IEEE802.3 MAC frame shown in FIG. 2.

In the signaling parameter used in this embodiment, a cut-through declarator 914 corresponding to the cut-through declarator 101 shown in FIG. 1 is designated in the first three bytes of the SNAP header, i.e., in the OUI field. Similarly, a flow identifier 915 corresponding to the flow identifier 102 shown in FIG. 1 is specified in the remaining two bytes of the SNAP header, i.e., in the PID field.

In this manner, in the SVC of the ATM, all the items 101–103 of the cut-through identifier shown in FIG. 1 can be filled in the information items of the signaling message.

It is thus possible to transmit the ATM signaling message containing the cut-through label identifier to the neighboring node. Accordingly, the same cut-through label identifier (i.e., the common identifier of a virtual connection dedicated to a specific datagram flow for the cut-through transfer) can be obtained by both the node and its neighboring node across the virtual connection, without the need to send a message other than the signaling message. Additionally, since the cut-through declarator is described in the OUI field of the signaling message, the receiving node is able to determine that the virtual connection established by this signaling is a cut-through transfer VC and is not a default VC that is used in the network-layer transfer. Furthermore, in either case where the node is connected with the IEEE802 network or the ATM network, which are physically different, an upper-layer protocol processing can be performed according to the cut-through label identifier having the same format.

Figure 10:
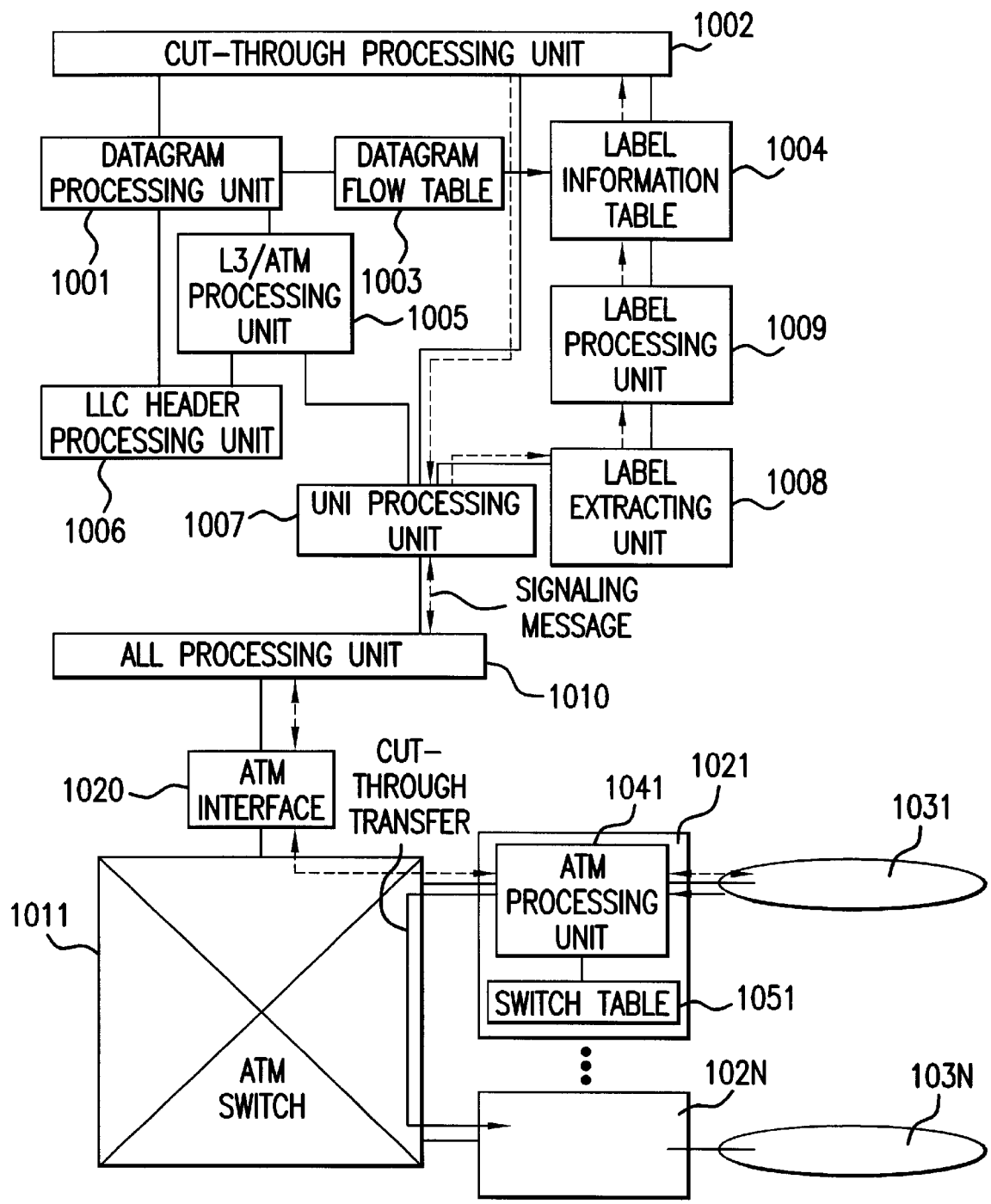
FIG. 10 is a block diagram illustrating an example of the configuration of a router for performing a high-speed transfer operation by using the cut-through label identifier shown in FIG. 1 according to another embodiment of the present invention.

FIG. 10 illustrates an example of the configuration of a router for performing a high-speed transfer operation by using the cut-through label identifier shown in FIG. 1 according to another embodiment of the present invention.

The router shown in FIG. 10 uses an ATM switch 1011 in performing the cut-through transfer operation according to the cut-through protocol, such as the FANP or the TDP. The ATM switch 1011 has ATM interfaces 1020 through 102N. The ATM interface 1020 is used for the internal processing for the router, while the ATM interfaces 1021 through 102N are connected to networks 1031 through, 103N, respectively. The networks 1031 through 103N, which are ATM networks, are connected to the router of this embodiment by using the UNI Specification defined by the ATM Forum.

ATM cells received by the respective ATM interfaces 1021 through 102N are transferred to an ATM Adaptation Layer (AAL) processing unit 1010 via the ATM switch 1011 if switch table 1051 of the receiving interface indicates the ATM interface 1021, and are assembled into an AAL Protocol Data Unit (PDU). The AAL PDU is further assembled into a packet, which then undergoes processing in the network layer by a datagram processing unit 1001. The datagram processing unit 1001 may have a function for determining the network-layer address of the next-hop node and the output network interface (and, as the case may be, the destination MAC address) according to the final destination, such as the destination IP address, of the datagram.

A cut-through processing unit 1002 executes protocol processing required for performing the cut-through transfer operation (datalink-layer switching) by using the cut-through label identifier adopted in this embodiment. More specifically, by exchanging a message including the cut-through label identifier with the neighboring node, the cut-through processing unit 1002 identifies which cut-through label identifier (in this case, a virtual connection) will be used for cut-through transferring a specific packet flow, and then sets, based on the cut-through label identifier, a label information table 1004, a datagram flow table 1003, and an ATM switch table 1051, all of which will be described later. As the protocol used for this operation, the FANP or the TDP may be employed, as noted above.

The cut-through processing unit 1002 stores in the datagram flow table 1003 the relationship between the datagram flow to be transferred and the cut-through label identifier. Then, when the router of this embodiment is a starting point of a path on which the cut-through transfer is performed and transmitting a datagram of a specific packet flow, the datagram processing unit 1001 determines the cut-through label identifier by referring to the datagram flow table 1003, and further determines, based on the cut-through label identifier, the VPI/VCI of the virtual connection onto which the cell of the datagram is to be transmitted.

The label information table 1004 stores the relationship between the cut-through label identifier used in this embodiment and the virtual connection (VPI/VCI) through which the cell is to be transferred in the ATM.

An L3/ATM processing unit 1005 executes the following processing: determining the ATM address of the next-hop node and/or the ATM VC information for transmitting datagrams, ATM Address Resolution Protocol (ARP) processing for operating the IP on the ATM network, and outputting to a UNI processing unit 1007 a request for setting the ATM VC based on the ATM address information obtained by ATM ARP processing.

An LLC-header processing unit 1006 determines the upper-layer protocol based on the value of the LLC header described in the received frame, and then delivers the received frame to the datagram processing unit 1001 or the L3/ATM processing unit 1005.

The UNI processing unit 1007 is used for executing, for example, ATM Forum UNI processing, to achieve the SVC function of the ATM. More specifically, the UNI processing unit 1007 performs signaling in response to a signaling setting request from the L3/ATM processing unit 1005 or the cut-through processing unit 1002, and also delivers a received signaling message to the L3/ATM processing unit 1005 and/or a label extracting unit 1008 in accordance with the upper-layer protocol information contained in the signaling parameter of the signaling message.

The label extracting unit 1008 extracts the cut-through label identifier used in this embodiment from the signaling message shown in FIG. 9, which has been transferred from the UNI processing unit 1007, and then delivers the extracted cut-through label identifier to a label processing unit 1009.

The label processing unit 1009 registers in the label information table 1004 the extracted cut-through label identifier and the VPI/VCI included in the signaling message shown in FIG. 9, and also reports to the cut-through processing unit 1002 that the cut-through transfer VC has been set.

The AAL processing unit 1010 forms the datagram processed by the datagram processing unit 1001 into an ATM cell (segment) and then transfers it to the ATM switch 1011 via the ATM interface 1020. The AAL processing unit 1010 also assembles the ATM cell received from the ATM switch 1011 via the ATM interfaced 1020 into a datagram, and delivers the assembled information to the UNI processing unit 1007 or the LLC-header processing unit 1006.

The ATM switch 1011 has the function of transferring a cell into a desired interface based on the VPI/VCI information added in the header of the ATM cell.

The configuration of the network interfaces 1020 through 102N is described below by taking the network interface 1021 as an example. The network interface 1021 comprises an ATM processing unit 1041 and the switch table 1051.

The ATM processing unit 1041 searches the switch table 1051 by using the VPI/VCI added in the header of the received ATM cell, thereby determining the VPI/VCI (output VPI/VCI) to be subsequently added. When the ATM processing unit 1041 receives an ATM cell from the network 1031, the output VPI/VCI is written into the header of the ATM cell, and then the cell is transferred through the ATM switch 1011 to the desired ATM interface. When the ATM processing unit 1041 receives an ATM cell from the ATM switch 1011, the output VPI/VCI is written into the header of the ATM cell, and then the cell is transferred to the network 1031.

Figure 11:
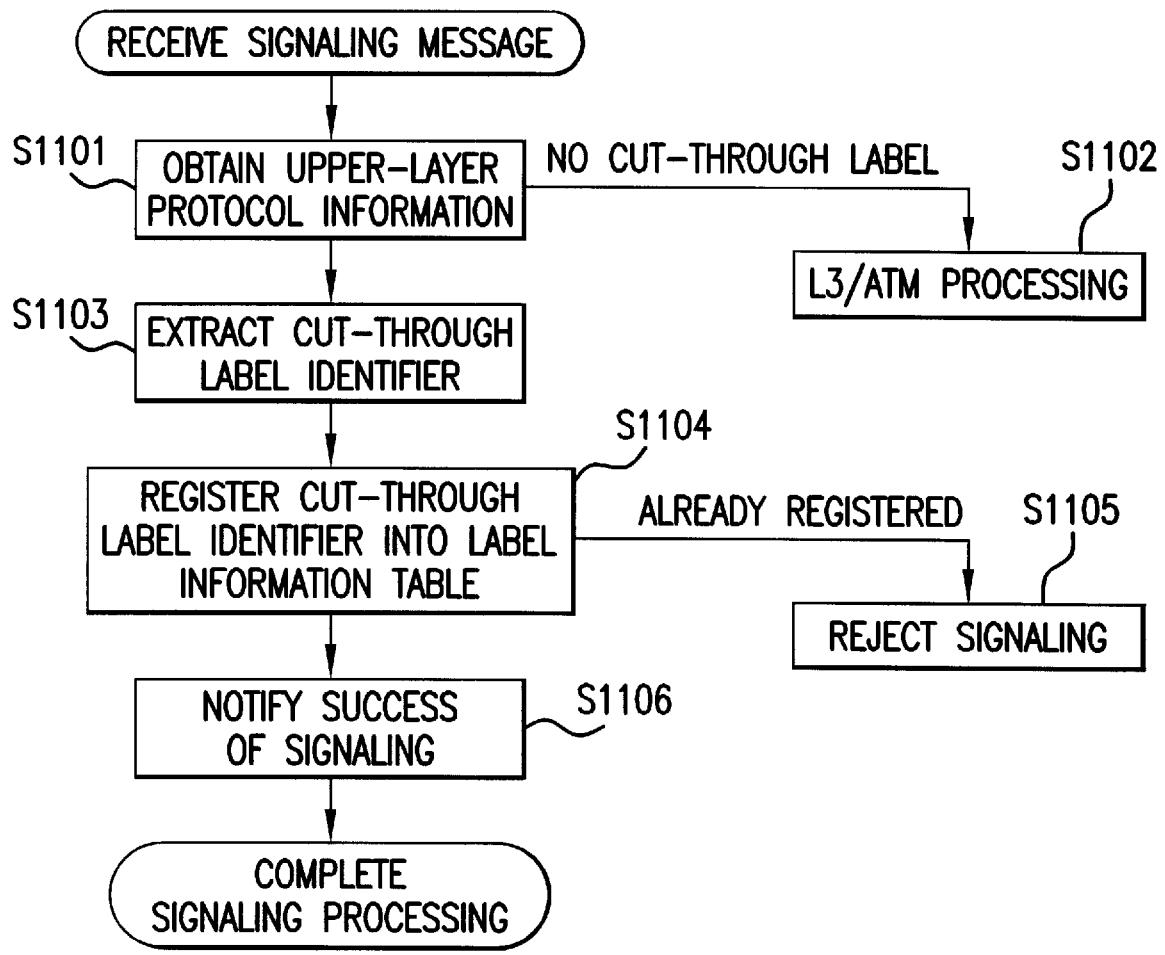
FIG. 11 is a flowchart illustrating an exemplary Switched Virtual Connection (SVC) processing executed by the router shown in FIG. 10 as a receiving side.

FIG. 11 is a flowchart illustrating an exemplary receiving-side SVC processing executed by the router using the cut-through, label identifier employed in this embodiment. The example where a signaling message has been received from the ATM interface 1021 is described below.

The AAL processing unit 1010 checks the VC value of the received ATM cell. If the VC is the signaling VC, the AAL processing unit 1010 sends the signaling message to the UNI processing unit 1007. The UNI processing unit 1007 then analyzes the signaling message to obtain the upper-layer protocol information contained in the signaling message (S1101).

If the upper-layer protocol information does not represent a cut-through virtual connection, i.e., if the B-LLI is not an ISO/IEC TR9577 parameter, or if the SNAP information included in the ISO/IEO TR9577 parameter does not include a cut-through declarator, it is determined that the upper-layer protocol information does not contain a cut-through label, and the ATM signaling message is transferred to another processing unit, such as, the L3/ATM processing unit 1005 (S1102).

If the upper-layer protocol information indicates that the VC to be established is a cut-through transfer virtual connection, the signaling message is transferred to the label extracting unit 1008 to extract the cut-through label identifier. The value in the source or destination ESI field, and the SNAP information (in particular, the flow identifier) in the B-LLI are extracted (S1103). The extracted cut-through label identifier is then transferred to the cut-through processing unit 1002.

The cut-through processing unit 1002 registers the cut-through label identifier (and the VPI/VCI in the signaling message, if necessary) in the label information table 1004 (S1104). If the same cut-through label identifier is already stored in the label information table 1004, the ATM signaling may be rejected (S1105).

If the cut-through label identifier has been successfully registered, the UNI processing unit 1007 reports to the calling node that ATM signaling has been successfully received (S1106). Then, the signaling receiving processing is completed.

According to the aforementioned ATM signaling processing, the common identifier (cut-through label identifier) of the virtual connection established by the signaling message can be reported from the calling node to the receiving node by the signaling message itself.

Figure 12:
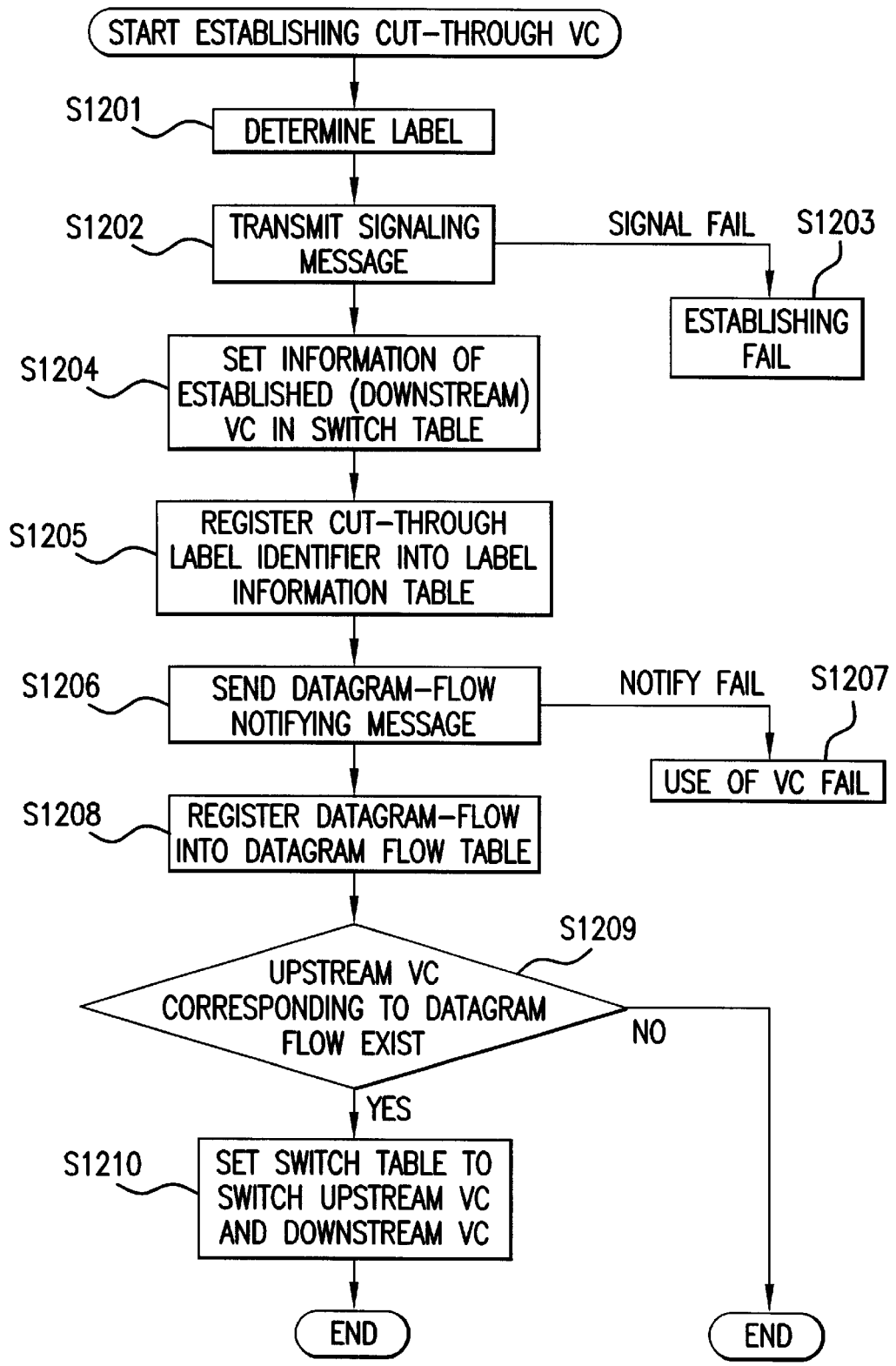
FIG. 12 is a flowchart illustrating an exemplary SVC calling processing and the process of transmitting a datagram-flow notifying message, executed by the router shown in FIG. 10.

FIG. 12 is a flowchart illustrating an exemplary calling-side SVC processing and an exemplary transmitting processing of the datagram-flow notifying message, executed by the router using the cut-through label identifier of this embodiment. The example where a signaling message is transmitted from the ATM interface 1021 is described below.

When a cut-through virtual connection is desired to be set, the cut-through processing unit 1002 determines the cut-through label identifier (VCID) to be assigned to the cut-through virtual connection to be set (S1201). It is determined that to set the cut-through virtual connection is desirable when, for example, a specific datagram passes through the datagram processing unit 1001 (this trigger may be called flow-driven), or when the information of the next-hop node corresponding to the final destination network-layer address is registered in the datagram processing unit 1001 according to the network-layer routing protocol (this trigger may be called topology-driven).

Depending on the system architecture, a certain number of unused cut-through virtual connections may be pooled and, when the cut-through transfer of a specific datagram flow is required, one of the unused virtual connections may be selected for the cut-through transfer. In this type of system, when the number of unused virtual connections becomes less than a prescribed number, it may be determined that a new cut-through virtual connection is desired to be set.

The cut-through processing unit 1002 writes the following items into the signaling message to be transmitted: the ATM address of the correspondent node of the virtual connection to be set, the ATM address of this router, and the cut-through label identifier (VCID) determined in S1101. The cut-through processing unit 1002 then instructs the UNI processing unit 1007 to transmit the signaling message (S1202). The cut-through processing unit 1002 writes the above items into the signaling message in such a manner that the cut-through label identifier is formed of the ESI field 908 of the destination or source ATM address and the SNAP field 913 of the upper-layer protocol information. If the ATM signaling processing has failed, the setting of the cut-through virtual connection is terminated (S1203).

If the ATM signaling processing has been successful, the switch table of the ATM interface 1020 is set (S1204) to enable the transfer operation by using the cut-through virtual connection established as described above. Then, the cut-through label identifier (VCID) and the VPI/VCI (contained in the signaling message) of the established cut-through virtual connection represented by the cut-through label identifier are registered in the label information table 1004 (S1205).

Then, at a prescribed timing, the cut-through processing unit 1002 sends to the receiving (downstream) node the datagram-flow notifying message including the above-described cut-through label identifier and the identifying information of the datagram flow to be transferred through the established cut-through virtual connection (S1206). This operation may be performed immediately after the cut-through virtual connection has been established. Alternatively,i in the system in which cut-through virtual connections are pooled, the operation may, be performed when it is desired that a specific datagram-flow be transferred by the cut-through scheme. It thus becomes possible for both this router and the downstream node to identify which virtual connection is to be used in transferring which datagram flow.

The cut-through label identifier determined in S1201 is included in the datagram-flow notifying message sent by the cut-through processing unit 1002. The relationship between the VPI/VCI of the established virtual connection and the cut-through label identifier is already known to the downstream node according to the ATM signaling message shown in FIG. 9, and then, the downstream node is able to perform an appropriate processing on cells received from the established virtual connection.

If the sending of the datagram-flow notifying message has failed, i.e., if the datagram-flow notifying message has been rejected by the downstream node, or if an acknowledge message of the datagram-flow notifying message has not been returned in a case where the protocol operating in the cut-through processing unit 1002 requires the acknowledge message, it is determined that: the datagram flow cannot be sent through the cut-through virtual connection (S1207).

If the same cut-through label identifier has been identified by both this router and the downstream node, as discussed above, the datagram flow is registered (S1208). That is, the relationship between the identifying information of the datagram flow to be transferred and the above-described cut-through label identifier as the output-side (downstream) label is registered in the datagram flow table 1003. In this case, it is checked whether an input-side (upstream) cut-through label identifier for the same datagram flow is registered in the datagram flow table 1003 (S1209). If not, the processing is ended.

If the outcome of S1209 is yes, for example, if the upstream cut-through label identifier represents the input virtual connection established in the ATM interface 102N of the router of this embodiment, the switch table of the ATM interface 102N is set in such a manner that the output interface for this input virtual connection is changed from the ATM interface 1020 to the ATM interface 1021 (S1210). Then, the switch table 1051 of the ATM interface 1021 is set in such a manner that the output VPI/VCI corresponds to the virtual connection established by the aforementioned calling processing. As a consequence, the ATM cell received through the ATM interface 102N from the input virtual connection represented by the input-side cut-through label identifier can be directly output through the ATM interface 1021 onto the output virtual connection represented by the output-side cut-through label identifier. That is, the cut-through transfer operation can be performed by bypassing the datagram (network-layer) processing.

The operations of S1202 through S1210 are independent of each other, and the order of the above steps is not restricted to the processing shown in FIG. 12. For example, the datagram-flow notifying message may be sent first, and then, signaling may be performed to set the virtual connection corresponding to the cut-through label identifier included in the datagram-flow notifying message.

Figure 13:
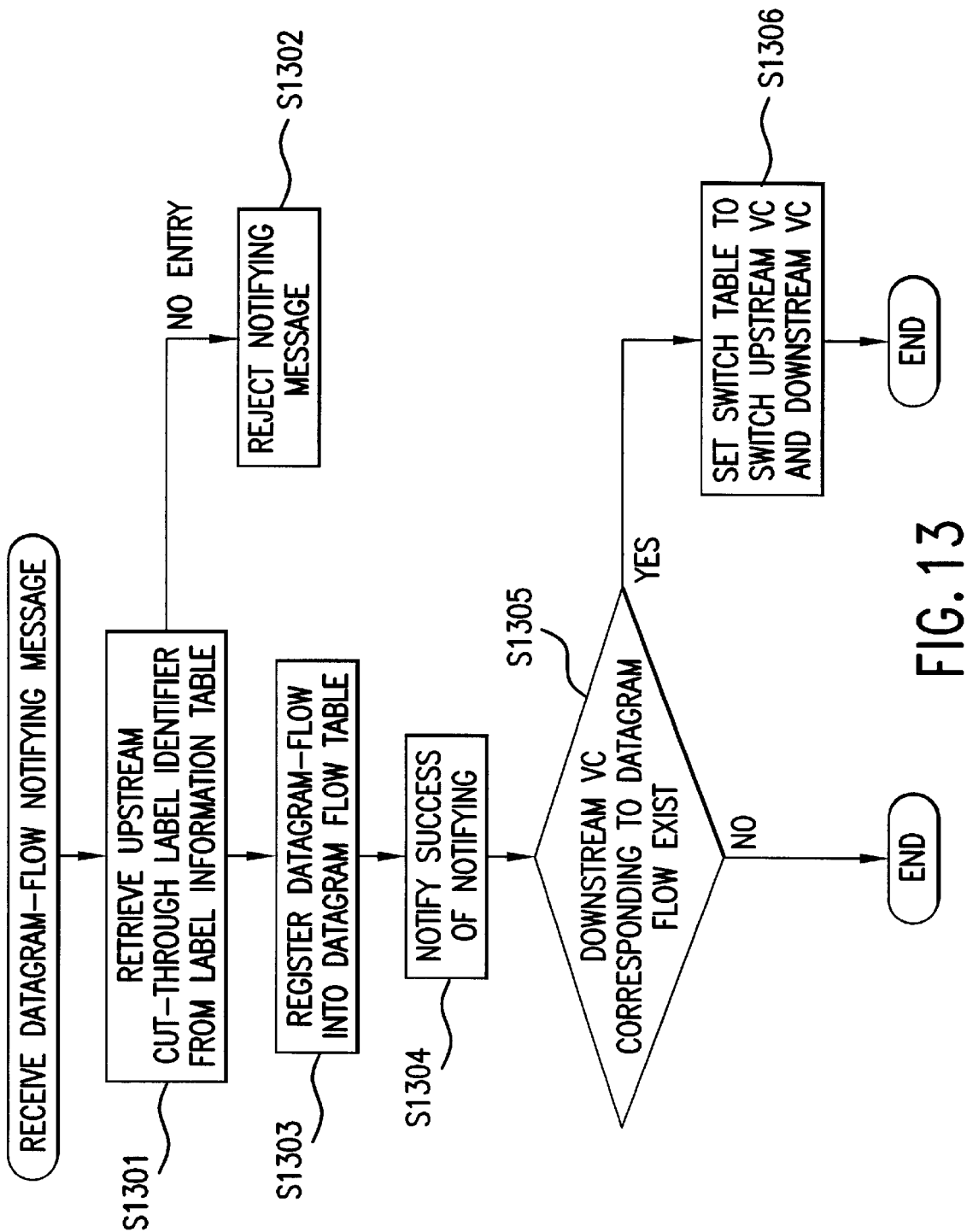
FIG. 13 is a flowchart illustrating the process of receiving a datagram-flow notifying message by the router shown in FIG. 10.

FIG. 13 is a flowchart illustrating an exemplary receiving processing of a datagram-flow notifying message executed by the router using the cut-through label identifier employed in this embodiment when the upstream node performs the operation of S1206 of FIG. 12.

If the datagram received by the AAL processing unit 1010 and the LLC-header processing unit 1006 is addressed to the router of this embodiment and is to be transferred to the cut-through processing unit 1002, the datagram processing unit 1001 transfers the datagram (which may be the datagram-flow notifying message) to the cut-through processing unit 1002.

If the datagram is the datagram-flow notifying message transferred from the upstream node, the cut-through processing unit 1002 searches the label information table 1004 by using the cut-through label identifier extracted from the datagram-flow notifying message as a key to check for the corresponding entry (S1301). The cut-through processing unit 1002 may sometimes check for the cut-through identifier even for another type of message. In this operation, however, the cut-through processing unit 1002 checks for the cut-through identifier for the datagram-flow notifying message. In most cases, the cut-through label identifier has been registered by the receiving-side SVC processing shown in FIG. 11. If there is no corresponding entry of the cut-through label identifier, the cut-through processing unit 1002 responds to the upstream node that the datagram-flow notifying message has been rejected (S1302). The upstream node is thus able to recognize that the sending of the datagram-flow notifying message has failed, and the processing in S1207 is executed.

The cut-through processing unit 1002 not only checks for the cut-through label, but also acquires the datagram-flow identifying information from the notifying message, and then conducts the registration of the datagram flow information (S1303). More specifically, the cut-through processing unit 1002 registers the relationship between the datagram-flow identifying information and the above-described input-side (upstream) cut-through label identifier in the datagram flow table 1003. This enables the router of this embodiment to have a correspondence between the cut-through label and the datagram-flow to be transferred by using the cut-through label coinciding with that of the upstream node.

The cut-through processing unit 1002 then responds to the upstream node that has transmitted the datagram-flow notifying message to notify that the notifying message has been successfully received (S1304). It is not necessary, however, to perform this step in a system where the protocol employed by the cut-through processing unit 1002 does not require an acknowledge message.

According to the aforementioned processing, the datagram flow to be transferred through the established cut-through virtual connection has been notified from the node that has requested the establishing of the cut-through virtual connection to the node that has received the request.

Thereafter, it is checked for the output-slide (downstream) cut-through label information corresponding to the same datagram-flow identifying information stored in the datagram flow table 1003 (S1305). If the output-side cut-through label does not exist, the processing is ended. If the output-side cut-through label information is found, and if this information indicates the output virtual connection from the ATM interface 102N of the router of this embodiment, the switch table 1051 of the ATM interface 1021 is set in such a manner that the output interface of the input virtual connection regarding which both this router and the upstream node come up to specify the same datagram-flow becomes the ATM interface 102N (S1306). The switch table of the ATM interface 102N is set in such a manner that the output VPI/VCI corresponds to the output virtual connection. As a consequence, the ATM cell received through the ATM interface 1021 from the input virtual connection represented by the input-side cut-through label identifier can be directly transferred through the ATM interface 102N onto the output virtual connection represented by the output-side cut-through label identifier. That is, the cut-through transfer operation can be performed by bypassing the datagram processing.

The operations in S1302 through S1306 are independent of each other, and the order of the steps is not limited to the processing illustrated in FIG. 13. For example, the datagram-flow notifying message may be received first, as illustrated in FIG. 13, and then, signaling processing for setting the virtual connection corresponding to the cut-through label identifier indicated by this notifying message may be executed, as shown in FIG. 11.

Upon completion of the processing shown in FIGS. 12 and the processing shown in FIGS. 11 and 13, the cut-through virtual connection has been established, and the information required for the node which will perform the cut-through transfer operation, i.e., the notifying of the datagram-flow to be transferred through the cut-through virtual connection, has been sent to the neighboring node. As a result, even the node that has performed the network-layer transfer operation is now able to perform the cut-through transfer operation in accordance with a determination of the cut-through processing unit 1002.

Figure 14:
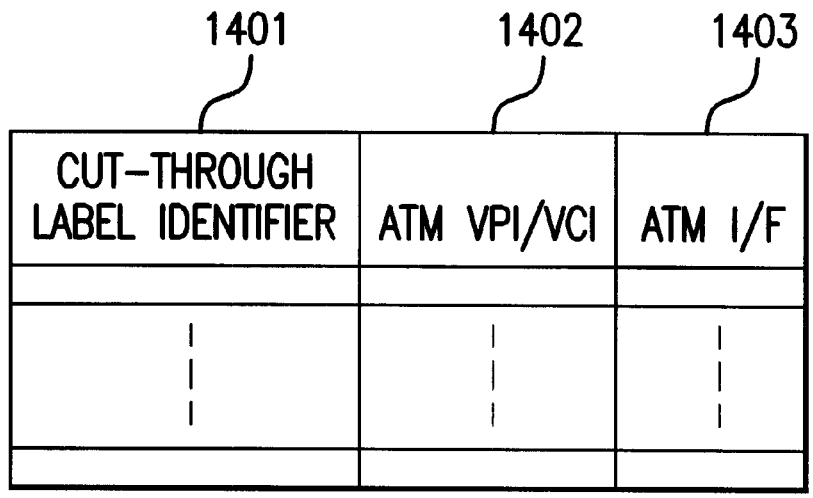
FIG. 14 illustrates an example of the configuration of a label information table.

FIG. 14 illustrates an example of the configuration of the label information table 1004 for acquiring the information on the output virtual connection required for transferring a datagram or the information on the input virtual connection required for receiving a datagram, according to the cut-through label identifier (VCID).

A cut-through label identifier column 1401 is not essential in the label information table 1004, but the cut-through label identifier is used as a key for searching the table 1004. As discussed above, the cut-through declarator of the cut-through label identifier may not be used as a search key.

An ATM VPI/VCI column 1402 indicates the VPI/VCI of the virtual connection corresponding to the cut-through label identifier used as a search key. According to the router configured as shown in FIG. 10, the ATM VPI/VCI column 1402 stores the VPI/VCI of the virtual connection established between the ATM interface 1020 and the ATM switch 1011. In a router having a configuration different from that shown in FIG. 10, the VPI/VCI of the virtual connection established between one of the ATM interfaces 1021 through 102N and a corresponding one of the networks 1031 through 103N may be used as the ATM VPI/VCI 1402.

An ATM I/F column 1403 indicates the ATM interface connected with the ATM network that accommodates the neighboring node that has identified in common with this router the cut-through label identifier used as the search key. The ATM I/F column 1403 is used for differentiating ATM networks when the same cut-through label identifier is exchanged through the different ATM interfaces. If, however, the MAC address is included in the cut-through label identifier, the ATM I/F column 1403 is not necessary. In contrast, in another type of router in which the VPI/VCI is that of a virtual connection established between one of the ATM interfaces 1021 through 102N and a corresponding one of the networks 1031 through 103N, the output virtual connection may be identified by a combination of the ATM I/F 1403 and the VPI/VCI 1402.

Figure 15:
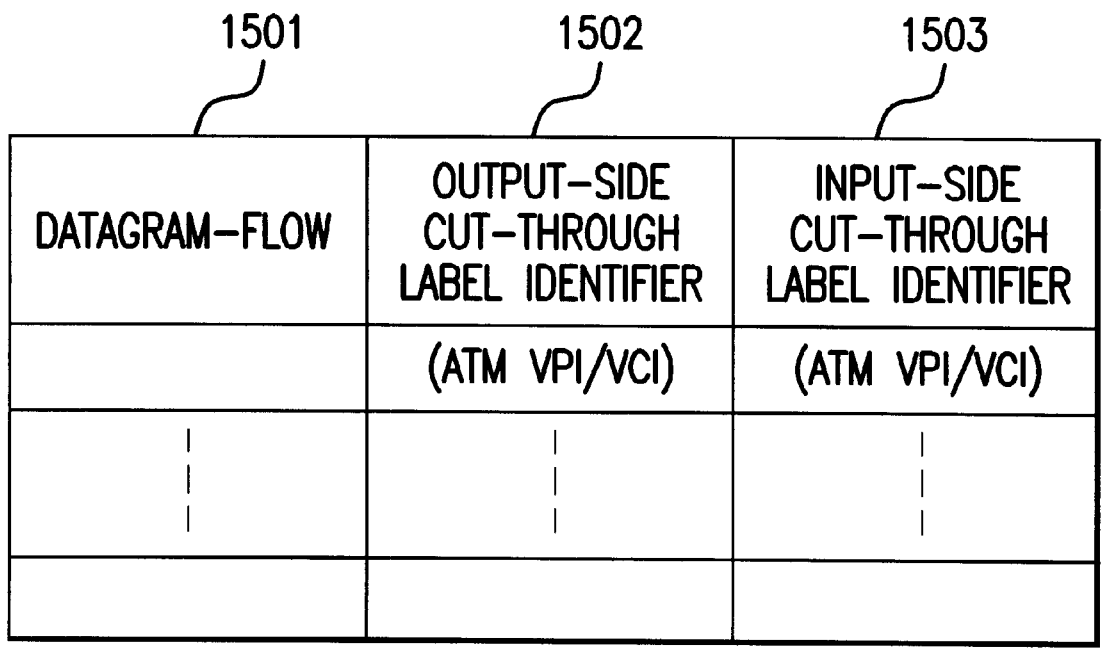
FIG. 15 illustrates another example of the configuration of the datagram-flow table.

In the router of this embodiment, when transmitting a datagram, the cut-through virtual connection is selected based on the datagram-flow identifying information by referring to the datagram flow table 1003. An example of the configuration of the datagram flow table 1003 is shown in FIG. 15.

A datagram flow column 1501 is not essential in this table 1003, but the datagram flow is used as a key for searching the table 1003. As the datagram-flow identifying information, the information similar to that in the Ethernet, as discussed above, is used.

An output-side cut-through label identifier column 1502 stores the information of the virtual connection represented by the output-side (downstream) cut-through label identifier (VCID). The ATM VPI/VCI may be stored in the column 1502. If the cut-through label identifier is set in the output-sidle cut-through label identifier column 1502, the label information table 1004 shown in FIG. 14 is searched to find the ATM VPI/VCI. To avoid searching the label information table 1003 and the datagram flow table 1004 twice, the information indicating the position of the entry in the label information table 1004 may be set in the output-side cut-through label identifier 1502.

An input-side cut-through label identifier column 1503 stores the information of the virtual connection represented by the input-side (upstream) cut-through label identifier (VCID). The ATM VPI/VCI may be stored in the column 1503. If the cut-through label identifier is set in the input-side cut-through label identifier column 1503, the label information table 1004 shown in FIG. 14 is searched to find the ATM VPI/VCI. To avoid searching the label information table 1003 and the datagram flow table 1004 twice, the information indicating the position of the entry in the label information table 1004 may be set in the input-side cut-through label identifier 1503.

It has been explained that the datagram flow table 1003 employed in the ATM illustrated in FIG. 15 can be configured similarly to the datagram flow table 303 shown in FIG. 3.

An example of the switch table of the ATM interface connected to the ATM switch 1011 of the router illustrated in FIG. 10 is shown in FIG. 16.

A VPI/VCI column 1601 stores the VPI/VCI added in the header of the ATM cell transferred from the ATM network or the ATM switch, and the VPI/VCI is used as a key for searching the switch table.

An output VPI/VCI column 1602 stores the VPI/VCI which is to be subsequently added in the header of the ATM cell. The output VPI/VCI is to be added in the header of the cell which will be transmitted out of the output ATM interface.

An output interface column 1603 stores the ATM interface to which the received cell is to be transferred. According to the router of this embodiment, the output interface 1603 indicates the ATM interface 1020 in the datagram (network-layer) transfer operation. On the other hand, when the cut-through transfer setting is completed by the processing shown in FIGS. 11 through 13, the output interface 1603 indicates one of the ATM interfaces 1021 through 102N.

FIG. 17 illustrates another example of the cut-through label identifier used for fulfilling the cut-through function provided for the router. This cut-through label identifier is employed for handling a plurality of address formats. The cut-through label identifier is formed of a cut-through declarator 1701, a flow identifier 1702, an address-type identifier 1703, and a link address 1704.

The cut-through declarator 1701 and the flow identifier 1702 are similar to the cut-through declarator 101 and the flow identifier 102, respectively, of the cut-through label identifier shown in FIG. 1.

The address-type identifier 1703 designates the address format included in the link address field, which is explained below.

The link address 1704, as well as the link address 103 illustrated in FIG. 1, is used for identifying the upstream or downstream node on the path on which the packet flow is transferred by the cut-through operations The address having the address format represented by the address-type identifier 1703 is set in the link address 1704. For example, the MAC address employed for the cut-through label identifier shown in FIG. 1 may be stored.

By virtue of the address-type identifier 1703, even if the information corresponding to the MAC address, such as the one shown in FIG. 9, cannot be acquired from the signaling message, for example, in the SVC having the ITU-TS E.164 address format employed in some ATM network, the E.164 address can alternatively be acquired and used as part of the cut-through label identifier.

The address-type identifier 1703 shown in FIG. 17 is required especially when the source link address is used as part of the cut-through label identifier. If the destination link address is used as part of the cut-through label identifier, the address-type identifier 1703 can be omitted.

The functions of the units in FIGS. 3 and 10 may be achieved by either software or hardware, or any combination of software and hardware. Also, the above described embodiment according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art. Such a software package can be a computer program product that employs a storage medium including stored computer code which is used to program a computer to perform the disclosed function and process of the present invention.

In addition to those already mentioned above, persons of ordinary skill will realize that many modifications and variations of the above embodiments may be made without departing from the novel and advantageous features of the present invention.

Accordingly, all such modifications and variations are intended to be included within the scope of the appended claims. The specification and examples are only exemplary. The following claims define the true scope and sprit of the invention.

What is claimed is:

1. A network interconnection apparatus comprising:
   a memory for storing an identifier for identifying a packet-flow to which a datalink frame belongs and a datalink-layer address of a next-hop node to which the datalink frame belonging to the packet-flow is to be transferred;
   a receiving unit for receiving a frame from one network; and
   a transfer unit for obtaining, when information in a prescribed portion within an upper-layer-protocol identifying information region of the frame received by the receiving unit indicates that A, datalink-layer switching is to be performed, a datalink-layer address of a next-hop node corresponding to a packet-flow to which the frame received by the receiving unit belongs by referring to the memory based on information in a remaining portion other than the prescribed portion within an upper-layer-protocol identifying information region, and transferring to another network the frame whose, destination address region contains the datalink-layer address obtained.

2. The apparatus according to claim 1, wherein the transfer unit examines whether a value in the prescribed portion is a prescribed value which represents the datalink-layer switching, and interprets a value in the remaining portion according to a protocol that relates to the prescribed value.

3. The apparatus according to claim 1, wherein the memory also stores, in correspondence with the identifier, another identifier for enabling the next-hop node to identify the packet-flow to which the datalink frame belongs, and the transfer unit writes information indicating that the datalink-layer switching is to be performed into the prescribed portion and the another identifier into the remaining portion, the prescribed portion and the remaining portion being within the upper-layer-protocol identifying information region of the frame to be transferred.

4. The apparatus according to claim 3, further comprising a processing unit for exchanging with the next-hop node a message correlating the packet-flow and the another identifier, the another identifier being assigned such that the next-hop node can uniquely identify each packet-flow to which a received frame belongs by examining the remaining portion of the received frame to be transferred from each of a plurality of previous-hop nodes including the apparatus to the next-hop node.

5. The apparatus according to claim 1, wherein the transfer unit searches the memory by using , as the identifier, information in a source datalink-layer address of the frame received by the receiving unit in addition to the information in the remaining portion.

6. The apparatus according to claim 5, wherein the memory also stores, in correspondence with the identifier, another identifier for allowing the next-hop node to identify the packet-flow to which the datalink frame belongs, and the transfer unit writes information indicating that the datalink-layer switching is to be performed into the prescribed portion and the another identifier into the remaining portion, the prescribed portion and the-remaining portion being within the upper-layer-protocol identifying information region of the frame to be transferred, and also writes an own datalink-layer address of the apparatus into a source address region of the frame to be transferred.

7. The apparatus according to claim 6, further comprising a processing unit for exchanging with the next-hop node a message correlating the packet-flow and the another identifier, the another identifier being assigned such that the next-hop node can uniquely identify each packet-flow to which a received frame belongs by examining the source address region and the remaining portion of the received frame to be transferred from each of a plurality of previous-hop nodes including the apparatus to the next-hop node.

8. The apparatus according to claim 1, further comprising a network-layer forwarding unit for analyzing, when the information in the prescribed portion does not indicate that the datalink-layer switching is to be performed, a destination network-layer address of a packet assembled from the frame received by the receiving unit, and transferring the frame according to a result of analyzing.

9. The apparatus according to claim 1, further comprising a processing unit for exchanging with a previous-hop node a message correlating the packet-flow and the identifier, the message including the identifier and a datalink-layer address of the apparatus or the previous-hop node according to a prescribed format independent of types of networks.

10. A network interconnection apparatus comprising:
    a receiving unit for receiving a signaling message for establishing a first virtual connection from a previous-hop node;
    a first registering unit for registering, when information described in a prescribed portion of a network-layer-protocol identifying information region of the signaling message received by the receiving unit indicates that a datalink-layer switching is to be performed, a first connection identifier for identifying the first virtual connection in common with the previous-hop node by extracting information described in a remaining portion other than the prescribed portion within the network-layer-protocol identifying information region;

a second registering unit for exchanging with the previous-hop node a flow-notifying message for correlating the first connection identifier and a packet-flow to be transferred through the first virtual connection, and registering a correspondence, to provide a correspondence registered, between the first virtual connection and a second virtual connection to a next-hop node of the packet-flow indicated by the flow-notifying message; and a transfer unit for transferring a frame received from the first virtual connection onto the second virtual connection by referring to the correspondence registered.

11. The apparatus according to claim 10, wherein the first registering unit examines whether a value in the prescribed portion is a prescribed value which represents the datalink-layer switching, and interprets a value in the remaining portion according to a protocol that relates to the prescribed value.

12. The apparatus according to claim 10, further comprising a transmitting unit for transmitting another signaling message for establishing the second virtual connection to the next-hop node, by providing in the another signaling message, the information indicating that the datalink-layer switching is to be performed in the prescribed portion of the network-layer-protocol identifying information region and a second connection identifier for identifying the second virtual connection in common with the next-hop node using the remaining portion of the network-layer-protocol identifying information region, and wherein the second registering unit exchanges with the next-hop node another flow-notifying message for correlating the second connection identifier and the packet-flow to be transferred through the second virtual connection.

13. The apparatus according to claim 12, wherein the second registering unit registers the correspondence by registering information provided in a connection identifying information region of the signaling message for the first virtual connection and information provided in a connection identifying information region of the another signaling message for the second virtual connection in correspondence.

14. The apparatus according to claim 12, wherein the transmitting unit provides in the another signaling message, a datalink-layer address of the apparatus in a source address region and a datalink-layer address of the next-hop node in a destination address region, and expresses the second connection identifier by using the source address region or the destination address region in addition to the remaining portion.

15. The apparatus according to claim 10, wherein the first registering unit registers information provides in a source datalink-layer address region of the signaling message in addition to the information described in the remaining portion as the first connection identifier.

16. The apparatus according to claim 10, further comprising a network-layer forwarding unit for analyzing, when no correspondent output virtual connection is registered by the second registering unit regarding a virtual connection from the frame is received, a destination network-layer address of a packet assembled from the frame received, and transferring the frame according to a result of analyzing.

17. The apparatus according to claim 10, wherein the receiving unit receives the signaling message including the first connection identifier partly constituted by a datalink-layer address of the apparatus or the previous-hop node according to a prescribed format independent of types of networks.

18. A frame transfer method comprising the steps of:

storing in a memory an identifier for identifying a packet-flow to which a datalink frame from one logical network belongs land a datalink-layer address of a next-hop node in another logical network to which the datalink frame belonging to the packet-flow is to be transferred;

receiving from said one logical network a frame in which information described in a prescribed portion of an upper-layer-protocol identifying information region indicates that a datalink-layer switching is to be performed;

writing the datalink-layer address obtained from the memory, by using information provided in a remaining portion other than the prescribed portion of the upper-layer-protocol-identifying information region as the identifier, into a destination address region of the frame received; and transmitting the frame to said another logical network.

19. A frame transfer method comprising the steps of:

receiving a signaling message in which information provided in a prescribed portion of a network-layer-protocol identifying information region indicates that a datalink-layer switching is to be performed, the signaling message for establishing a first virtual connection from a previous-hop node;

obtaining a first connection identifier for identifying the first virtual connection in common with-the-previous-hop node, by using information provided in a remaining portion other than the prescribed portion of the network-layer-protocol identifying information region;

receiving from and/or transmitting to the previous-hop node a flow-notifying message including the first connection identifier, the flow-notifying message for notifying a packet-flow to be transferred through the first virtual connection;

storing in a memory information for switching the first virtual connection with a second virtual connection to a next-hop node of the notified packet-flow; and transferring a frame received from the first virtual connection onto the second virtual connection in accordance with the information stored in the memory.

20. A computer usable medium having computer readable program code embodied therein for a computer functioning as a network interconnection device which transfers datalink frames from one network to another network, the computer readable program code includes:

a first computer readable program code for causing said computer to register in a memory an identifier for identifying a packet-flow to which a datalink frame belongs and a datalink-layer address of a next-hop node to which the datalink frame belonging to the packet-flow is to be transferred;

a second computer readable program code for causing said computer to receive a frame in which information in a prescribed portion of an upper-layer-protocol identifying information region indicates that a datalink-layer switching is to be performed; and third computer readable program code means for causing said computer to write the datalink-layer address retrieved from the memory according to information described in a remaining portion other than the prescribed portion of the upper-layer-protocol identifying information region, into a destination address region of the received frame to be transferred.

21. A computer usable medium having computer readable program code means embodied therein for a computer functioning as a network interconnection device which transfers datalink frames from a first virtual connection-onto-a second virtual connection, the computer readable program code means includes:

first computer readable program code means for causing said computer to receive a signaling message in which information described in a prescribed portion of a network-layer-protocol identifying information region indicates that a datalink-layer switching is to be performed, the signaling message for establishing the first virtual connection from a previous-hop node;

second computer readable program code Means for causing said computer to obtain a first connection identifier for identifying the first virtual connection in common with the previous-hop node, by using information described in a remaining portion other than the prescribed portion of the network-layer-protocol identifying information region;

third computer readable program code means for causing said computer to exchange with the previous-hop node a flow-notifying message including the first connection identifier, the flow-notifying message for notifying a packet-flow to be transferred through the first virtual connection; and fourth computer readable program code means for causing said computer to register information for switching the first virtual connection with a second virtual connection to a next-hop node of the notified packet-flow.

* * * * *